US009674128B1

(12) United States Patent
Browning et al.

(10) Patent No.: US 9,674,128 B1

(45) Date of Patent: Jun. 6, 2017

(54) ANALYZING DISTRIBUTED GROUP DISCUSSIONS

(71) Applicant: Blab, Inc., Seattle, WA (US)

(72) Inventors: Randolph Browning, Mercer Island, WA (US); David Aaron Snelling, Bellevue, WA (US); Stefan Nicholas Papp, Seattle, WA (US); Bernhard G. Zimmermann, Seattle, WA (US); Oliver B. Downs, Redmond, WA (US)

(73) Assignee: BLAB, INC., Seattle, WA (US)

( * ) Notice: Subject to any disclaimer, the term of this patent is extended or adjusted under 35 U.S.C. 154(b) by 0 days.

(21) Appl. No.: 15/173,402

(22) Filed: Jun. 3, 2016

Related U.S. Application Data

(62) Division of application No. 13/787,545, filed on Mar. 6, 2013, now Pat. No. 9,386,107.

(51) Int. Cl.
*G06F 15/16* (2006.01)
*H04L 12/58* (2006.01)

(52) U.S. Cl.
CPC .............. *H04L 51/16* (2013.01); *H04L 51/02* (2013.01); *H04L 51/04* (2013.01); *H04L 51/32* (2013.01)

(58) Field of Classification Search
CPC ......... H04L 51/16; H04L 51/02; H04L 51/04; H04L 51/32
USPC .................................................. 709/203–206
See application file for complete search history.

(56) References Cited

U.S. PATENT DOCUMENTS

| | | | |
|---|---|---|---|
| 8,176,046 B2 | 5/2012 | Druzgalski et al. | |
| 8,261,193 B1 | 9/2012 | Alur et al. | |
| 8,285,598 B2 | 10/2012 | Mesaros | |
| 8,312,056 B1 | 11/2012 | Peng et al. | |
| 8,321,792 B1 | 11/2012 | Alur et al. | |
| 8,364,171 B2 | 1/2013 | Busch | |
| 8,380,607 B2 | 2/2013 | Bollen et al. | |
| 2003/0126090 A1* | 7/2003 | Fukuoka | G06Q 10/10 705/54 |
| 2010/0100537 A1 | 4/2010 | Druzgalski et al. | |
| 2011/0276681 A1* | 11/2011 | Lee | G06F 17/30899 709/224 |

(Continued)

OTHER PUBLICATIONS

Kaltenbrunner et al., "Description and Prediction of Slashdot Activity," *Fifth Latin American Web Congress*, LA-Web (21):57-66, 2007, 10 pages.

*Primary Examiner* — Minh-Chau Nguyen
(74) *Attorney, Agent, or Firm* — Seed Intellectual Property Law Group LLP

(57) ABSTRACT

Techniques are described for analyzing user-supplied information, including in at least some situations to predict future aspects of additional related information that will be supplied by users. The user-supplied information that is analyzed may, for example, include distributed group discussions that involve numerous users and occur via user comments made to one or more social networking sites and/or other computer-accessible sites. The analysis of user-supplied information may, for example, include determining particular topics that are of interest for a specified category during one or more periods of time, quantifying an amount of user interest in particular topics and the category during the period of time, predicting future amounts of user interest in the particular topics and the category during one or more future period of times, and taking one or more further actions based on the predicted information.

30 Claims, 13 Drawing Sheets

(56) References Cited

U.S. PATENT DOCUMENTS

| | | | |
|---|---|---|---|
| 2011/0302006 A1 | 12/2011 | Avner et al. | |
| 2011/0302103 A1* | 12/2011 | Carmel | G06Q 30/0282 705/347 |
| 2011/0313842 A1 | 12/2011 | Avner et al. | |
| 2011/0314007 A1 | 12/2011 | Dassa et al. | |
| 2012/0005221 A1 | 1/2012 | Ickman et al. | |
| 2012/0011158 A1 | 1/2012 | Avner et al. | |
| 2012/0016948 A1 | 1/2012 | Sinha | |
| 2012/0143694 A1 | 6/2012 | Zargahi et al. | |
| 2012/0150645 A1 | 6/2012 | Mandyam et al. | |
| 2012/0166278 A1 | 6/2012 | MacGregor et al. | |
| 2012/0323908 A1 | 12/2012 | Herbert, Jr. et al. | |
| 2013/0036107 A1 | 2/2013 | Benyamin et al. | |
| 2013/0198204 A1* | 8/2013 | Williams | G06F 17/30283 707/748 |
| 2014/0095425 A1 | 4/2014 | Sipple | |
| 2014/0095943 A1* | 4/2014 | Kohlenberg | H04L 29/08 714/47.3 |
| 2014/0122622 A1 | 5/2014 | Castera et al. | |

* cited by examiner

Example User-Supplied Comments and Comment Groups

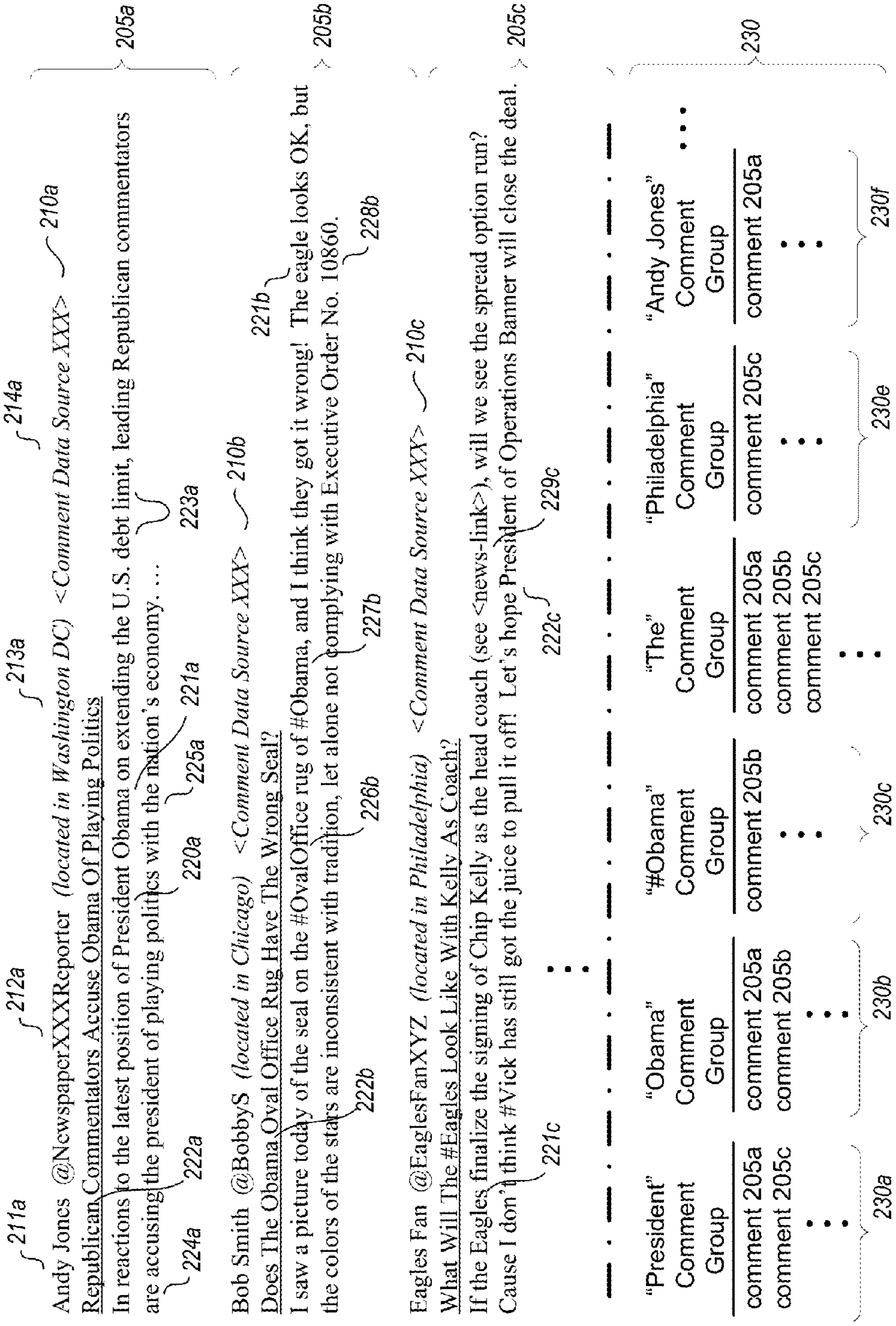

*Fig. 2A*

211a — Andy Jones *@NewspaperXXXReporter* *(located in Washington DC)* *<Comment Data Source XXX>* — 210a
212a — 213a — 214a Republican Commentators Accuse Obama Of Playing Politics In reactions to the latest position of President Obama on extending the U.S. debt limit, leading Republican commentators are accusing the president of playing politics with the nation's economy. ...
224a — 220a — 225a — 221a — 223a
222a Bob Smith *@BobbyS* *(located in Chicago)* *<Comment Data Source XXX>* — 210b
221b Does The Obama Oval Office Rug Have The Wrong Seal?

I saw a picture today of the seal on the #OvalOffice rug of #Obama, and I think they got it wrong! The eagle looks OK, but the colors of the stars are inconsistent with tradition, let alone not complying with Executive Order No. 10860. ...
226b — 227b — 228b
222b Eagles Fan *@EaglesFanXYZ* *(located in Philadelphia)* *<Comment Data Source XXX>* — 210c What Will The #Eagles Look Like With Kelly As Coach?

If the Eagles finalize the signing of Chip Kelly as the head coach (see <news-link>), will we see the spread option run? Cause I don't think #Vick has still got the juice to pull it off! Let's hope President of Operations Banner will close the deal.
221c — 222c — 229c

---

| "President" Comment Group | "Obama" Comment Group | "#Obama" Comment Group | "The" Comment Group | "Philadelphia" Comment Group | "Andy Jones" Comment Group |
|---|---|---|---|---|---|
| comment 205a | comment 205a | comment 205b | comment 205a | comment 205c | comment 205a |
| comment 205c | comment 205b | | comment 205b | | |
| | | | comment 205c | | |
| ... | ... | ... | ... | ... | ... |
| 230a | 230b | 230c | 230d | 230e | 230f |

230

205a, 205b, 205c

Example Supplemental Comments and Comment Groups

*241a*  *244a*
Andy Jones   <Comment Data Source YYY>   ⌐240a
Thanks to everyone for the comments on my Twitter post about #Obama and the U.S. debt limit! I plan to solve the Euro problems next ...

⋮

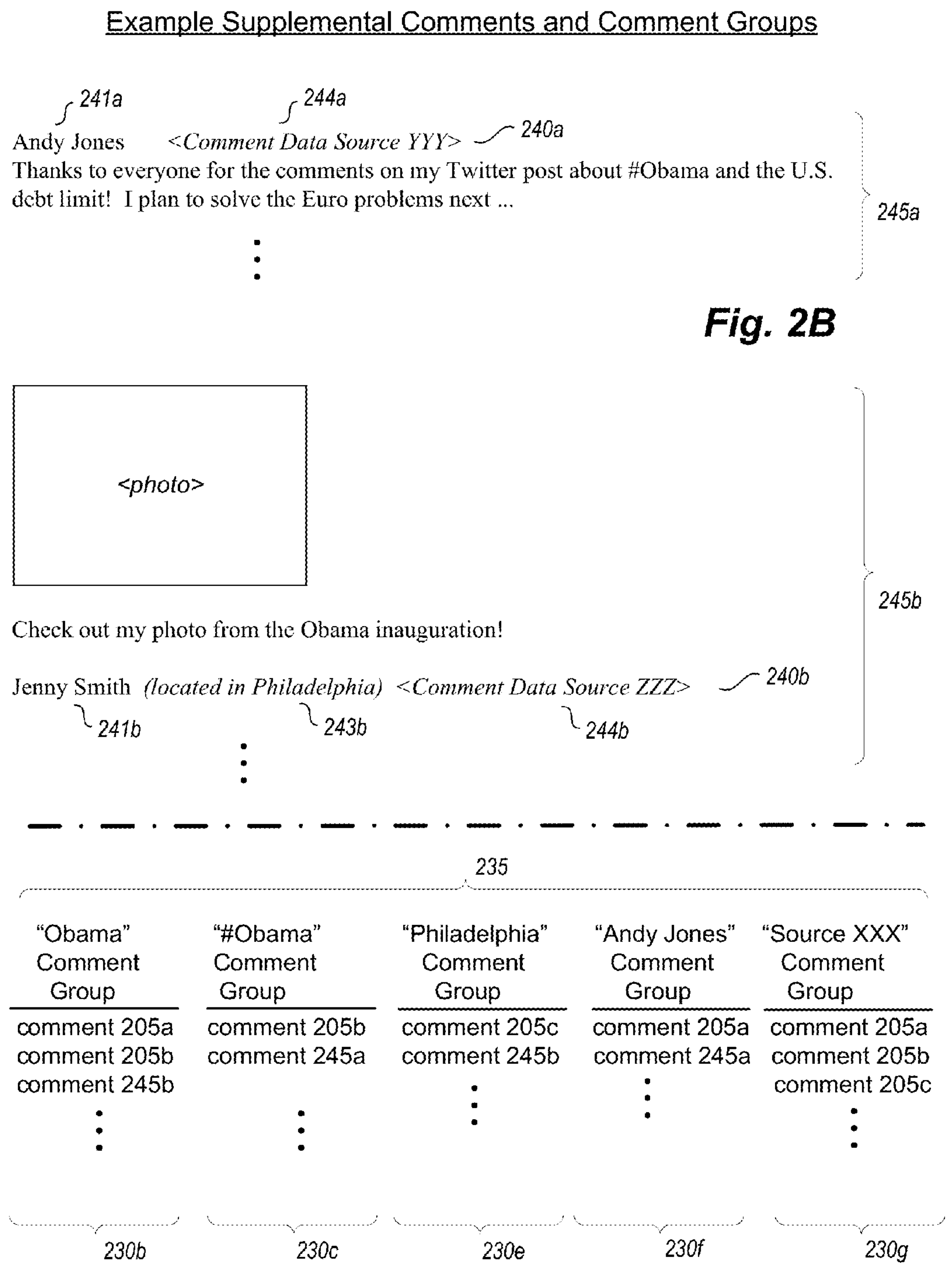

Check out my photo from the Obama inauguration!

Jenny Smith *(located in Philadelphia)* <Comment Data Source ZZZ>   ⌐240b
　　　241b　　　　　　　243b　　　　　　　　　244b

⋮

---

235

| "Obama" Comment Group | "#Obama" Comment Group | "Philadelphia" Comment Group | "Andy Jones" Comment Group | "Source XXX" Comment Group |
|---|---|---|---|---|
| comment 205a | comment 205b | comment 205c | comment 205a | comment 205a |
| comment 205b | comment 245a | comment 245b | comment 245a | comment 205b |
| comment 245b | ⋮ | ⋮ | ⋮ | comment 205c |
| ⋮ | | | | ⋮ |

230b　　　230c　　　230e　　　230f　　　230g

Example Category Information

*Fig. 2C*

| "President Obama" Category Comments ("President" "Obama" "White House") | "NFL" Category Comments ("NFL" "football") | . . . |
|---|---|---|
| comment 205a<br>comment 205b<br>comment 205c<br>comment 245a<br>comment 245b<br>⋮ | ⋮ | |
| 250a | 250b | |

250

| "President Obama" Category Comment Groups | Comment Group Frequency |
|---|---|
| "the" comment group | 9,923 |
| "naked" comment group | 2,882 |
| ⋮ | |
| 255a | |
| "Obama" comment group | 1,231 |
| "President" comment group | 982 |
| "democrat" comment group | 337 |
| "inauguration" comment group | 304 |
| "debt limit" comment group | 190 |
| "Washington DC" comment group | 132 |
| "republican" comment group | 109 |
| "Chicago" comment group | 101 |
| 255b | |
| ⋮ | |
| "eagle" comment group | 12 |
| "Chip Kelly" comment group | 5 |
| ⋮ | |

255 number of associated comments : 10,000
average comment group frequency : 92.3
maximum threshold: 1383.2 minimum threshold: 47.5

260

*Fig. 2D*
Example Time Window Quantification And Prediction
260
260a
Quantity Of Comments
Prior 30-Minute Time Periods
265
265a
265b

Example Prediction Template Generation

ANALYZING DISTRIBUTED GROUP DISCUSSIONS

TECHNICAL FIELD

The following disclosure relates generally to techniques for analyzing user-supplied information, such as to assess distributed group discussions and to predict future aspects of the discussions.

BACKGROUND

Discussions of current topics of interest by various distributed users are increasingly occurring via social networking sites and other computer-accessible sites that are available to the users, whether by users replying to and commenting on information supplied by other users, or by various users independently submitting information that in aggregate reflects topics of interest. In some situations, a particular distributed group discussion may occur between a particular selected subset of users (e.g., users that are members of a common group, club, service, etc.), while in other situations a distributed group discussion may include any user with access to one or more sites via which that discussion occurs.

Information about discussions that have occurred and/or are occurring may have value to various types of entities. However, various problems exist with obtaining and disseminating such information in a timely manner, including due to the distributed nature of the discussions.

BRIEF DESCRIPTION OF THE DRAWINGS

FIGS. 2A-2E illustrate examples of analyzing distributed group discussions and predicting further aspects of the discussions.

DETAILED DESCRIPTION

Figure 1:
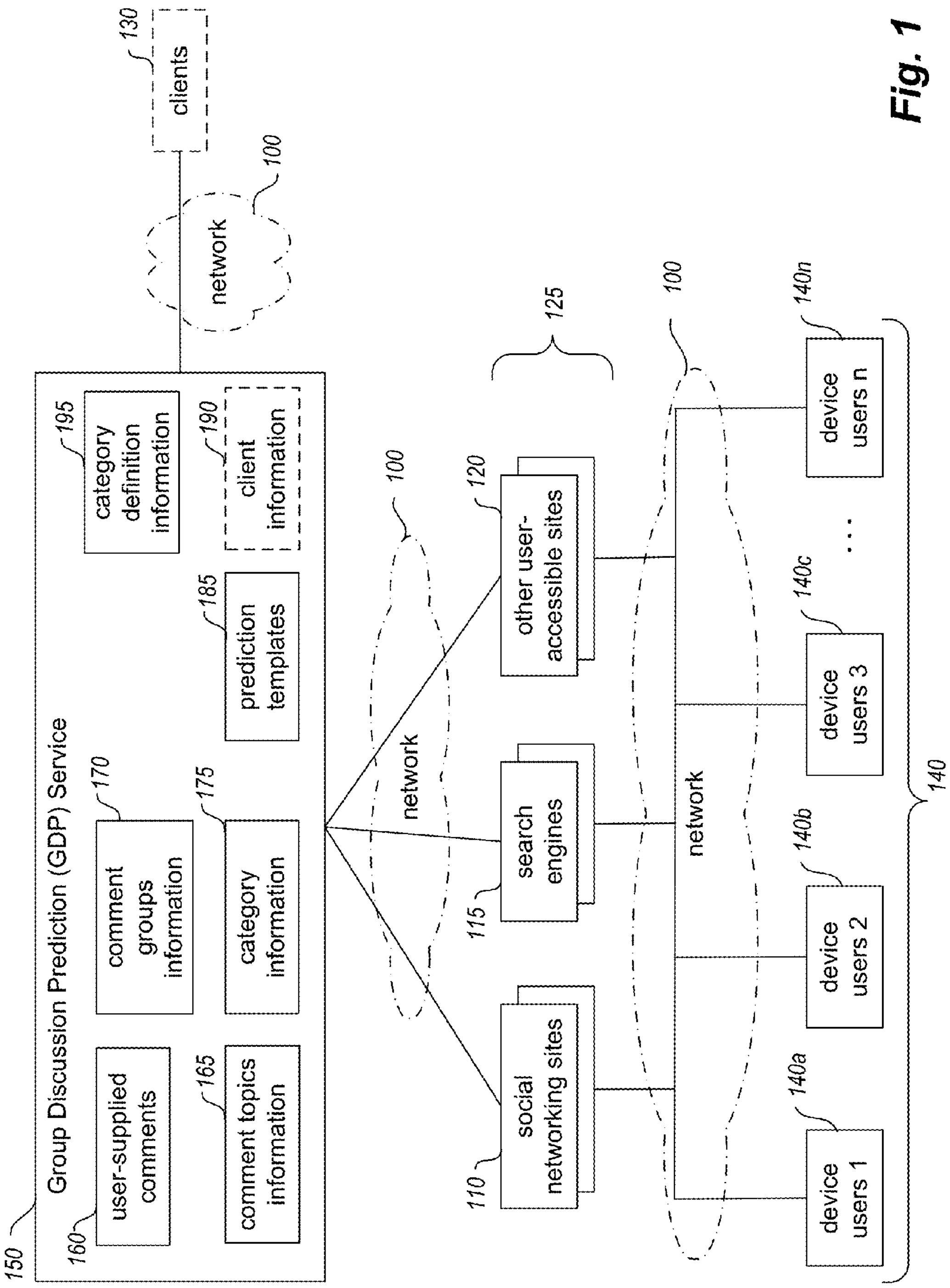
FIG. 1 is a network diagram illustrating an example embodiment of a service that analyzes distributed group discussions and predicts further aspects of the discussions.

Techniques are described for analyzing user-supplied information in various ways, including in some embodiments to predict future aspects of additional related information that is expected to be supplied by users, such as during one or more future time periods. In at least some embodiments, the user-supplied information that is analyzed corresponds to distributed group discussions that involve numerous users and occur via user comments made to one or more computer-accessible sites, such as one or more social networking services. The analysis of user-supplied information may, in at least some embodiments, include determining particular topics that are being discussed for a specified category during one or more periods of time, quantifying an amount of user interest in particular topics and the category during the period of time from the discussion, and predicting future amounts of user interest in the particular topics and the category as part of an expected future discussion during one or more future period of times. As one illustrative example, millions of user Twitter tweets, user posts to social networking sites, and other user-supplied comments or other content items may be analyzed over a prior window of time (e.g., the last 72 hours) in a real-time or near-real-time manner, and changes in information corresponding to particular topics and categories of interest may be automatically predicted for a future span of time (e.g., the next 24 hours), with various types of further actions then being taken based on the predicted information. Additional details related to analyzing user-supplied information in particular manners are described below, and some or all of the described techniques are performed in at least some embodiments by automated operations of a Group Discussion Prediction ("GDP") system.

The user comments and other user-supplied information that are obtained and analyzed may have various forms in various embodiments, such as to reflect information that is supplied by human users and made available to other users. For example, the user-supplied information may, in at least some embodiments, include posts and other user submissions to sources of such user-supplied information (generally referred to as "comment data sources" herein) that include one or more social networking services or sites, such as tweets to the Twitter service, and/or posts to Facebook, MySpace, Google+, LinkedIn, etc. In addition, in at least some embodiments and situations, the user-supplied information may include comments or other content items submitted to various other types of computer-accessible sites that may act as comment data sources, such as Instagram, Pinterest, Flickr, Picasa, YouTube, 43 Things, etc. In other embodiments and situations, any type of user-supplied information that is made available to one or more other users may be analyzed and used, including in text form, audio form and/or video form, such as user emails, SMS ("Short Message Service") messages, Internet chat messages, telephone voice messages and other audio recordings, video recordings, search engine searches, news articles and other news releases, commerce-related submissions (e.g., user wish lists or gift registries, user shopping carts, etc.), Wiki-based submissions (e.g., to Wikipedia), etc., and is generally referred to herein as a "user-supplied comment" or "user comment."

By gathering such user-supplied information during one or more time periods of interest, information may be assessed about distributed group discussions that occur during those time periods, including for discussions in which users actively review and respond to comments of others, and more generally for discussions that occur via various user comments that each reflects independent thoughts or opinions of a user that is not in response to any other particular user comment of another user. Such assessed information may correspond to one or more selected factors about one or more distributed group discussions, including one or more of the following factors for user comments or other content items being supplied with respect to one or more topics of interest: a quantity of user comments or other content items for the topic(s) that are supplied during a time period (or another measure of distributed user interest in those topics rather than content item quantity); subsets of such an overall quantity (or other measure of distributed user interest) supplied during a time period for the topic(s) that are associated with particular geographic locations or geographic areas, and/or with particular author users, and/or with particular content item data sources; changes in assessed values for one or more such factors between two or more time periods; etc. In addition, such assessed information corresponding to one or more selected factors for the topic(s) may be used to predict future information about user comments or other content items that will be supplied for the topic(s), such as predicted future values for a particular one or more of the selected factors for each of one or more future time periods, or instead for other types of predicted future information. Additional details related to assessing values for factors of interest and using such information to make corresponding predictions are included below.

FIG. 1 is a network diagram illustrating an example embodiment of a service that analyzes distributed group discussions and predicts further aspects of the discussions. In particular, an example embodiment of a GDP (Group Discussion Prediction) Service 150 is illustrated, such as may be provided by a GDP system (not shown) executing on one or more configured computing systems (not shown). One or more client entities 130 may optionally use devices (not shown) to interact with the GDP service 150 over one or more networks 100, such as to provide information about categories or other information of interest, and/or to receive corresponding predicted information and/or other analyzed information from the GDP service 150. The GDP service 150 may store any information received from such clients in various manners, such as to store any received category definition information 195, and any other received client information 190.

FIG. 1 further illustrates various users 140 who each have one or more associated client devices, which the users use to interact with one or more comment data sources 125 over one or more networks 100, such as by supplying user comments or other content items (not shown) to those comment data sources. In this example, the comment data sources 125 include one or more social networking sites 110, one or more search engines 115, and one or more other user-accessible sites 120. Such comment data sources may have various forms in various embodiments, and the resulting user comments or other user-supplied content items may similarly have various forms in various embodiments, as discussed in greater detail elsewhere. After users 140 have provided user comments or other user-supplied content items to comment data sources 125, the GDP service 150 may interact with the comment data sources 125 over one or more networks 100 to obtain corresponding content items, and to store such information 160 for subsequent analysis.

As part of the operation of the GDP service 150, it may further analyze the user-supplied content items to identify particular topics and other attributes of the content items, and to store corresponding information 165. The content item information 160 and topics information 165 may further be used to create corresponding comment groups, and to store corresponding information 170. The GDP service 150 may then use such information to determine particular topics that are associated with a particular category during one or more periods of time, such as based on the created comment groups associated with those topics, and store corresponding category information 175. The GDP service 150 may further quantify the user-supplied content items included in a particular comment group and/or associated with a particular category, and use such information for one or more time periods to predict expected additional content items that will be received over one or more later time periods, with corresponding information being stored with the comment group information 170 and/or the category information 175. As part of performing the prediction, the GDP service 150 may use one or more defined prediction templates from information 185, and may further generate and store such prediction templates for later use based on actual content items that are received. In addition, the GDP service 150 may further take a variety of types of automated actions based on analyzed and/or predicted information, such as in accordance with client instructions or other client-specified criteria. Additional details related to operation of the GDP service in particular embodiments are included herein.

The one or more networks 100 may, for example, be a publicly accessible network of linked networks, possibly operated by various distinct parties, such as the Internet. In other embodiments, at least one of the network(s) 100 may be a private network, such as, for example, a corporate or university network that is wholly or partially inaccessible to non-privileged users. In still other embodiments, at least one of the network(s) 100 may include one or more private networks with access to and/or from the Internet. In the illustrated embodiment, the GDP service 150 may include one or more modules that perform particular operations, as discussed in greater detail with respect to FIG. 3, and the GDP service 150 and any such modules may each include software instructions that execute on one or more computing systems (not shown) to configure those computing systems to perform some or all of the described techniques.

Thus, user-supplied information of interest may be obtained in various manners in various embodiments, including by the GDP service or system accessing a particular comment data source to retrieve information from that comment data source (e.g., periodically, when the data is needed for analysis, etc.). For example, a GDP service may obtain information from a particular comment data source in various manners, such as via an API ("application programming interface") provided by that data source, by retrieving information stored in a database or other storage mechanism, by scraping one or more Web pages of a Web site provided by the comment data source, etc. The GDP service may further obtain some or all of the available data from a particular comment data source, such as for one or more particular users and/or time periods, for all users and/or time periods, for users and/or information that meet specified criteria (e.g., publicly available information that does not have privacy restrictions), etc. In other embodiments and situations, at least some comment data sources may perform actions to supply at least some user-supplied information to the GDP service, such as in response to one or more prior requests of the GDP service (e.g., via an RSS, or Really Simple Syndication, feed, or other subscription request of the GDP service). In addition, in some embodiments and situations, at least some user-supplied comments may be received directly from a user that supplied them to one or more comment data sources, such as if a mobile application executing on a client device of the user also sends the comments to the GDP service. Furthermore, in some embodiments and situations, information that was initially supplied to one or more comment data sources may be available to the GDP service from another source, such as from an aggregator service that combines information from multiple comment data sources. In other embodiments, other types of user-supplied information may be obtained and/or other types of comment data sources may be used, and additional details are included below about obtaining user-supplied information of interest to analyze.

Once user-supplied information has been obtained for a particular time period, the user-supplied information may be analyzed in various manners. In some embodiments, the analysis includes analyzing user comments or other user-supplied content items to create corresponding comment groups for the time period. For example, each user-supplied content item may be analyzed to identify any topics of interest in the content, such as terms or phrases, hashtags, links to other data, or other n-grams, and optionally for topics that are determined to be of sufficient importance or relevance to the content item (e.g., by using a TF-IDF, or term frequency-inverse document frequency, analysis, or other content analysis technique). In addition, each user-supplied content item may be analyzed to identify any other types of attributes of interest that are associated with the content item (e.g., in the contents of the content item, in metadata associated with the content item, etc.), such as a location of where the content item was submitted from, an author user who generated or otherwise supplied the content item, a comment data source from which the content item was obtained, any n-grams from metadata associated with the content item, etc. After topics or other attributes of interest are identified, a comment group is created for each such topic or other attribute (or for a selected subset, such as to reflect a percentage or fixed quantity of the most relevant topics or other attributes) for a time period, with the created comment group including any analyzed content items from the time period that include the associated attribute for the comment group. In addition, in at least some embodiments, if additional user-supplied content items are available that were not used in the initial analysis (e.g., from one or more additional or supplemental comment data sources), additional such user-supplied content items that were supplied during the time period are retrieved, and additional content items that include the topic or other associated attribute for each created comment group are added to that comment group. Thus, each created comment group may be considered to represent its associated topic or other associated attribute for that time period. In other embodiments, information about content items may be analyzed and grouped in other manners, and additional details are included below about analyzing user comments or other user-supplied content items to create corresponding comment groups for a time period.

The analysis of user-supplied information for a time period may also include determining current topics that correspond to a particular content category for the time period. For example, a definition for a category of interest may be supplied or otherwise determined, such as to include one or more terms or other attributes corresponding to the category. User-supplied content items for the time period that include one or more of the definition terms or other definition attributes for the category are then identified (e.g., content items having one of the definition attributes, or all of the definition attributes, or a minimum defined quantity or percentage of the definition attributes), and the created comment groups to which those identified content items belong are then determined, with those determined comment groups being candidates to be associated with the content category for the time period. At least some of the determined comment groups are then excluded in some embodiments and situations, such as to remove comment groups that are under-inclusive or over-inclusive with respect to the subject matter relevant to the content category. The topics or other attributes associated with the remaining determined comment groups may then be identified as being the current topics for the content category during the time period. In at least some embodiments, the determination of candidate comment groups to exclude includes determining, for each candidate comment group, the frequency that its included user-supplied content items are in the identified content items for the content category. An average frequency and a standard deviation may then be determined across the candidate comment groups and used to establish lower and/or upper boundaries for the content category, such as to define a minimum exclusion threshold that is the average frequency minus half the standard deviation, and/or to define a maximum exclusion threshold that is the average frequency plus half the standard deviation. In other embodiments, comment groups to include for a content category may be determined in manners other than based on frequency of included user-supplied content items, and additional details are included below about determining current topics that correspond to a particular content category for a time period.

The analysis of user-supplied information for a time period may further include predicting information about expected additional content items that will be supplied by users for a comment group and/or content category, such as during each of one or more future time periods of interest. For example, the analysis may include quantifying information about the user-supplied content items included in the comment group and/or associated with the content category for the time period, such as based on a quantity of such user-supplied content items. In some situations, the quantification is further performed for particular subsets of the user-supplied content items included in the comment group and/or associated with the content category for the time period, such as to correspond to an intersection of that comment group and/or content category with a particular geographical location (for those content items supplied from each of one or more geographical locations), to correspond to an intersection of that comment group and/or content category with a particular author user (for those content items supplied by each of one or more author users), to correspond to an intersection of that comment group and/or content category with a particular comment data source (for those content items supplied to each of one or more comment data sources), etc. Such quantification information for the time period may then be combined with other corresponding quantification information for other related time periods, such as for all of the time periods during a sliding time window of interest (e.g., for every 30-minute time period during a 72-hour time window), and used to generate a histogram or other aggregation of that combined quantification information. The aggregated quantification information may then be used to generate predicted information about expected additional content items that will be supplied by users for the comment group or content category (or particular intersection) corresponding to the aggregated quantification information.

For example, a non-exclusive list of types of information that may be predicted for a comment group and/or a category include the following: a predicted amount (or change) in total quantity of the comments included in the comment group and/or associated with the category (or particular intersection) in one or more future time periods; a predicted direction of increase or decrease in the quantity of the comments included in the comment group and/or associated with the category (or particular intersection) in one or more future time periods; a predicted change in which topics or other attributes will be associated with the category in one or more future time periods; a predicted amount (or change) of influence of one or more author users who supply content items included in the comment group and/or associated with the category (or particular intersection) in one or more future time periods; a predicted amount (or change) of one or more types of sentiment in the content items included in the comment group and/or associated with the category (or particular intersection) in one or more future time periods; a predicted amount (or change) of comments from one or more geographical locations that are included in the comment group and/or associated with the category (or particular intersection) in one or more future time periods; a predicted direction of increase or decrease in the quantity of the comments from one or more geographical locations that are included in the comment group and/or associated with the category (or particular intersection) in one or more future time periods; a predicted amount (or change) of comments from one or more comment data sources that are included in the comment group and/or associated with the category (or particular intersection) in one or more future time periods; a predicted direction of increase or decrease in the quantity of the comments from one or more data sources that are included in the comment group and/or associated with the category (or particular intersection) in one or more future time periods; etc.

In some embodiments and situations, the generating of the prediction information includes performing trend prediction based on the aggregated quantification information for a comment group and/or category (or particular intersection), such as by doing a $2^{nd}$ degree polynomial least squares fit to the quantification information in the generated histogram or other aggregation (e.g., using weighting to reflect time and/or one or more other factors for the quantification information in the generated histogram or other aggregation), and using the resulting trend line to determine the predicted information. In other embodiments and situations, the generating of the prediction information includes matching the generated histogram or other quantification aggregation to a portion of a defined prediction template (e.g., to an initial subset of an additional histogram that is based on quantified information for prior actual user-supplied content items that have been received), and using an additional portion of the defined prediction template (e.g., a later subset of the additional histogram) to indicate the predicted information. In other embodiments, other types of information may be quantified and used to generate prediction information for a comment group and/or content category (or particular intersection), and additional details are included below about predicting information about expected additional content items that will be supplied by users for a comment group and/or content category (or particular intersection).

The analysis of user-supplied information for a time period may further include generating a prediction template that reflects actual user-supplied content items that are received over time for a comment group and/or content category, such as for later use in predicting information about expected additional content items that will be supplied by users. For example, a histogram or other aggregation of quantification information that is generated to reflect user-supplied content items received for a comment group and/or a content category (or particular intersection) may be analyzed to determine if the histogram or other quantification aggregation is successful in predicting other expected content items that will be received in other situations. In addition, or alternatively, trend prediction information that is generated based on a generated histogram or other quantification aggregation for a comment group and/or a content category may be analyzed to determine if the corresponding predicted information reflects later user-supplied content items that are actually received for the comment group or content category. When a generated histogram or other quantification aggregation and/or corresponding trend prediction information is found to be successful in predicting other user-supplied content items, it may be put into use as a prediction template in predicting additional future user-supplied content items that will be received, such as to further evaluate its performance. In other embodiments, prediction templates may be generated in other manners, and additional details are included below about generating a prediction template for later use in predicting information about expected additional content items that will be supplied by users.

After the analysis of user-supplied information for one or more time periods is performed, various types of resulting automated actions may be taken, such as based on analyzed information about the user-supplied content items that have already been received and/or based on predictions about additional user-supplied content items that are expected to be received. For example, information from the analysis may be provided to one or more clients of the GDP service, such as users or other entities who pay fees to receive information about specified content categories of interest. In addition, in some embodiments and situations, information from the analysis is used by the GDP service to take automated actions to supply additional content items that correspond to a comment group or category of interest (e.g., additional comments that are generated by the GDP service and made available to users), or to otherwise supply information corresponding to the comment group or category (e.g., initiating or changing related Internet-based advertising or other advertising), optionally in accordance with instructions or other criteria specified by one or more clients of the GDP service—such additional information may, in some situations, alter or otherwise affect future direction of a particular distributed group discussion, such as by including additional supplemental information to further support particular topics and conversations, by including additional information to refute or otherwise alter a discussion about particular topics, etc. In other embodiments, various other types of actions may be taken by the GDP service in appropriate circumstances, and additional details are included below about taking automated actions based on information generated from the analysis of user-supplied information for one or more time periods.

In addition, other types of analysis of user-supplied information for one or more time periods may be performed in at least some embodiments, such as to generate additional types of information related to distributed group discussions. As a first example, information about users who supply content items in one or more comment groups and/or associated with one or more categories during one or more time periods may be analyzed, such as to determine particular author users who have a high or low amount of influence within the comment groups or categories (e.g., relative to other author users for the same or other comment groups and/or categories), such as to be able to direct how a discussion evolves or changes. As a second example, information about content items in one or more comment groups and/or associated with one or more categories during one or more time periods may be analyzed, such as to perform a sentiment analysis with respect to contents of the content items (e.g., by using term/symbol list matching; topic decomposition and subspace projection; Bayesian classification or other classification techniques, such as using training data from human-annotated sentiment assignments of particular user comments; etc.). Such additional types of discussion-related information for one or more comment groups and/or one or more categories over one or more time periods may be used in various manners, including to take some or all of the same types of automated actions as discussed above, or instead to take other types of automated actions. In other embodiments, various other types of analyses may be performed by the GDP service to generate various other types of additional discussion-related information, and additional details are included below about performing analyses with respect to author user influence and/or sentiment analysis.

For illustrative purposes, some embodiments are described below in which specific types of user-supplied information is analyzed to provide particular types of resulting information related to distributed group discussions in specific ways, including to predict various types of information about expected future user-supplied information that will be received. However, it will be understood that such information related to distributed group discussions may be generated in other manners and using other types of input data in other embodiments, that the described techniques may be used in a wide variety of other situations for other types of data, that other types of information related to distributed group discussions may similarly be generated and used in various ways, and that the invention is thus not limited to the exemplary details provided.

FIGS. 2A-2E illustrate examples of analyzing distributed group discussions and predicting further aspects of the discussions, such as by an example embodiment of the GDP service (not shown). While particular example types of user comments, comment groups and categories are discussed, it will be appreciated that the details are provided for illustrative purposes, and that the described techniques may be used with a variety of other types of user-supplied information.

In particular, FIG. 2A illustrates several example user comments 205, along with information about some corresponding initial comment groups 230 that may be created based at least in part on these user comments. In this example, the user comments 205 include comments supplied by different users to a single comment data source (referred to in this example as "comment data source) XXX"), such as the Twitter social networking service, although user-supplied information from multiple sources may be obtained and analyzed when creating initial comment groups in some embodiments. In addition, in this example, the illustrated user comments are submitted during a single time period (e.g., within a 30-minute time period), although particular timing information is not illustrated.

In particular, in this example, a first user comment 205*a* is shown, which includes various metadata 210*a* and other content (which in this example includes a title and accompanying textual content). The metadata 210*a* that is available to the GDP service in this example includes an author user name 211*a*, an author user source-specific identifier 212*a*, information 213*a* about a geographical location from which the comment was supplied, and information 214*a* about the comment data source to which the user comment was supplied—at least some such information may not be displayed to other users, however, such as the geographical location information 213*a* and/or the comment data source information 214*a*. In this example, an analysis of the user comment may identify a variety of topics or other attributes that may be used for subsequent analysis, including in some embodiments and situations to treat each word or phrase in the contents as a topic, and to include each of the indicated types of metadata information 211*a*, 212*a*, 213*a* and 214*a* as a comment attribute. Examples of topics that may be used from the comment's contents include words in the title (e.g., "republican" 222*a*), words in the content body (e.g., "president" 220*a*, "Obama" 221*a*, "are" 224*a*, "the" 225*a*, etc.), and phrases (e.g., "debt limit" 223*a*). In other embodiments, a subset of the words/phrases and other attributes may be selected using one or more of a variety of types of information analysis techniques, such as to eliminate words that are too common to be useful in identifying the subject matter of the comment (e.g., "the", "of", etc.), and to ignore differences in capitalization, hyphenation, stemming, etc.

The user comments 205*b* and 205*c* similarly include metadata 210 and other contents, and include various types of information that may be used as topics or other attributes for those comments. For example, user comment 205*b* includes the term "Obama" 222*b* in a manner similar to term 221*a* of comment 205*a*, as well as various other terms (e.g., "eagle" 221*b* and "10860" 228*b*). Comment 205*b* is also illustrated as including two in-line metadata hashtags that may be used as topics for the comment, which in this example are "#OvalOffice" 226*b* and "#Obama" 227*b*. In some embodiments and situations, terms such as "Obama" and "#Obama" may be grouped together and treated as the same topic, while in the illustrated embodiment the terms are handled separately. User comment 205*c* similarly includes various terms, which in this example includes a user-selectable link 229*c* (e.g., an HTML hyperlink)—in some embodiments, such links and/or associated metadata for the links (e.g., terms that are included as part of the link, tags or other metadata associated with the link, etc.) may be used as topics, and in some embodiments contents of such a link may be retrieved and analyzed for use as contents and/or metadata of user comment 205*c* in a manner similar to other inline contents, while in other embodiments one or more both such types of information may not be used. In some embodiments, a user comment may further have additional information supplied by other users that may similarly be used as a topic or attribute for the comment (e.g., hashtags, such as #president or gunny; other types of tags, such as "funny" or "like" or "useful" or "☺"; etc.), although such types of additional information are not illustrated in this example. It will be appreciated that the identification of topics or other attributes for one or more user comments may be performed in a variety of manners in various embodiments. For example, in some embodiments the analysis is performed in a language-neutral manner (e.g., when extracting n-grams from the contents of a user comment), and thus the user comments may include comments in multiple languages—in some such embodiments, translation capabilities may further be employed to translate at least some user comments into one or more target languages before the identification of topics or other attributes for those user comments. As one non-exclusive example of a particular set of techniques for identifying at least some topics or other attributes for at least some user comments, the following steps may be employed: n-grams are extracted from comment title and body text by first converting the text to a collection of n-grams (e.g., bi-grams or tri-grams); the n-grams containing predefined common words in at least some positions are removed from consideration; a most significant set of X n-grams are then selected based on scoring (e.g., via a pointwise mutual information, or PMI, algorithm), with X being a configurable predefined number or otherwise being determined based on the available data (e.g., a specified percentage); and changes in significance of the n-grams are tracked as more comments containing them are identified.

After the topics and other attributes are identified for a variety of user comments being analyzed, comments groups may be created for each of some or all of the topics and other attributes. A few example comment groups 230 are illustrated, along with information about particular example comments included in each comment group. For example, the "President" comment group 230*a* is based on the term "president", and includes at least comments 205*a* and 205*c*, since those comments include terms 220*a* and 222*c*, respectively, that match the term (but does not include comment 205*b* in this example, despite its contents being related to the president of the United States, since the term "president" is not included in comment 205*b*). Comment groups 230*b* and 230*c* correspond to the terms "Obama" and "#Obama", respectively, and the comment group based on the term "the" reflects that most or all comments may include such common terms. Comment groups 230*e* and 230*f* provide examples of comment groups corresponding to comment attributes that may be from metadata rather than contents of at least some user comments, such as for comment group 230*e* corresponding to a particular geographical location (in this example, the city of "Philadelphia") and including any comments supplied from that geographical location (with other comment groups, not shown, corresponding to other geographical locations), and for comment group 230*f* corresponding to a particular author user (in this example, user "Andy Jones") and including any comments supplied by that author user (with other comment groups, not shown, corresponding to other author users). It will be appreciated that geographical locations and users may be represented in a variety of manners in various embodiments, including at differing degrees of specificity (e.g., to represent geographical locations by individual addresses, GPS coordinates, neighborhoods, cities, regions, counties, states, countries, etc.; and to represent users via legal names, source-specific login names or screen names or other identifiers, numeric or other unique identifiers, etc.). While not illustrated here, comment groups may also be created for each of multiple distinct comment data sources, to include comments supplied to those comment data sources.

FIG. 2B continues the example of FIG. 2A, and in particular illustrates additional user comments and corresponding information for some of the created comment groups 230. In particular, after user comments are analyzed for a time period and initial user comment groups are created, those user comment groups may in some embodiments and situations be supplemented to include information about additional related user comments, such as from one or more additional supplemental comment data sources.

In the example of FIG. 2B, additional user comments are obtained from two additional comment data sources, referred to in this example as "comment data source YYY" (as shown in information 244*a*) and "comment data source ZZZ" (as shown in information 244*b*). For example, comment data source YYY may include primarily textual comments, in a manner similar to that comment data source XXX (e.g., posts to the Facebook social networking service), while the comment data source ZZZ may include primarily non-textual comments that include some textual tags or other commentary (e.g., images posted to the Pinterest or Instagram social networking sites). Various other types of comments and content items may be analyzed in other embodiments, as discussed in greater detail elsewhere.

In this example, the additional user comment 245*a* from comment data source YYY includes an additional comment from author user "Andy Jones" 241*a* who also supplied comment 205*a* of FIG. 2A, although the metadata available to the GDP service from comment data source YYY does not include geographical location information or a source-specific identifier. Nonetheless, if the GDP service is able to identify the two users as the same person, such as by creating, maintaining and using a mapping between different identifiers for a particular user, the "Andy Jones" comment group 230*f* is modified to include this comment 245*a*, as shown in the modified comment group information 235 of FIG. 2B—alternatively, in some embodiments, such a comment would be added to the comment group without attempting to verify a common identity, such as based on the author name matching for both comments. Comment 245*a* is also added to the "#Obama" comment group 230*c* based on its inclusion of an #Obama hashtag in its comments.

Additional user comment 245*b* from comment data source ZZZ includes a photo and related supplementary text, and is added to the "Obama" comment group 230*b* (based on the term being included in the textual commentary) and the "Philadelphia" geographical location comment group 230*e* (based on geographical location information 243*b*) for the comment 245*b*. While not illustrated here, in some embodiments an analysis of data in a user comment may be performed to identify additional attributes that may be used to associate the user comment with one or more appropriate comment groups. For example, with respect to the example user comment 245*b*, an image recognition process and/or other analysis of the photo may be performed to identify additional metadata attributes (e.g., based on identified objects, people, locations, etc.) for the user comment—illustrative examples include the following: to recognize President Obama within the photo, and thus associate the user comment with comment group 230*b* even if the provided commentary was absent; to recognize Washington D.C. or the Capitol building from the photo, and associate the user comment with corresponding comment groups; to examine location and time metadata embedded in the photo or otherwise associated with the photo, and use the location data to associate the user comment with a corresponding comment group; etc. In some embodiments, a comment group 230*e* will include both comments that are supplied from the geographical location of Philadelphia and comments that include the term "Philadelphia" in the contents or other attributes of the comment, while in other embodiments the comment group 230*e* will only include comments that are supplied from the geographical location of Philadelphia. The modified comment group information 235 further illustrates an example of a data source comment group 230*g* in this example, which corresponds to comment data source XXX, although such a comment group 230*g* would not be modified in this supplemental operation in this example since the additional user comments are not from the comment data source XXX. In addition, if new topics or attributes are included in the additional user comments that were not present in the initially analyzed user comments (e.g., comments from author user "Jenny Smith" 241*b*), new comment groups may be created for such new topics or attributes in some embodiments, while in other embodiments such new comment groups will not be created.

FIG. 2C continues the examples of FIGS. 2A and 2B, and in particular illustrates determining information for a category of interest based in part on the user comments and created comment groups discussed in FIGS. 2A and 2B. In particular, definition information is first obtained for one or more categories of interest, and matching user comments are identified, as reflected in section 250 of FIG. 2C. In this example, a first "President Obama" category has been defined, which in this example includes terms "President", "Obama", and "White House" in its definition, and a second "NFL" category has been defined, which in this example includes terms "NFL" and "football". The various user comments for the time period of interest are searched, and any comments matching one or more of the definition terms is associated with the corresponding category. None of the example user comments is associated with the NFL category in this example, as none of the user comments included the terms "NFL" or "football" (although user comment 205*c* of FIG. 2A did have subject matter corresponding to a particular NFL football team). All of the example user comments have been associated with the President Obama category in this example, as each comment included at least one of the category definition terms (although the "president" term included in the football-related user comment 205*c* of FIG. 2A did not actually refer to President Obama). It will be appreciated that the matching of comments and categories may be performed in a variety of manners in various embodiments, including based on contents of the comments and/or based on metadata associated with the comments. For example, in some embodiments, a match between a term or attribute in a comment and a term or attribute for a category definition may be identified and used to associate the comment with the category, such as if measured by a vector inner product or other matching technique. Alternatively, a comment may be projected into a comment group subspace, with the comment group having a projection into a category. In addition, if a photo has been associated by one or more users with an "Obama" tag, the photo (and/or comment that contains the photo) may be associated with the President Obama category 250*a*, even if there is no other mention of "Obama" in the contents and/or other metadata for the photo/comment. Furthermore, rather than such tags being supplied by a user author of a comment and/or by other user reviewers of the comment, such tags may in some embodiments and situations be provided by a comment data source or other entity that provides information about and/or access to comments. Similarly, one possible source for category definition information in at least some embodiments includes such comment data sources or other entities that provide information about and/or access to comments.

After the matching user comments are associated with a category in section 250, all of the created comment groups to which those matching user comments belong are then identified, as shown in part in section 255 for the President Obama category. It will be appreciated that each user comment may be associated with multiple comment groups, and thus a large number of comment groups may be initially identified for a category. In the example of section 255, the identified comment groups are then analyzed to determine their relevance to the associated user comments shown in section 250. In particular, in this example, the frequency is determined for each identified comment group that the associated user comments in section 250 are included within that comment group. As an example, information 260 illustrates that 10,000 user comments have been identified as being associated with the "President Obama" category in section 250 (although only a small fraction are shown in section 250). Using the "The" comment group discussed in FIG. 2A as an example, of the 10,000 user comments that are associated with the "President Obama" category in section 250, almost all of those associated user comments include the term "the" and are thus included in the "The" comment group. In this example, the identified comment groups for the "President Obama" category are listed in section 255 in order of decreasing frequency, with the "The" comment group having the highest listed frequency, and a "Chip Kelly" comment group having a lowest listed frequency of 5 comments of the 10,000 associated user comments. For example, user comment 205*c* of FIG. 2A represents one of those 5 comments, since it includes the terms "Chip Kelly" and "president", causing it to be included in the associated user comments in section 250, but to have only 4 other comments in this time period that included both "Chip Kelly" and one of the category definition terms as topics or other attributes of those user comments.

Additional processing is then performed to select a subset of the identified comment groups as being associated with the "President Obama" category for this time period. In particular, as shown in information 260, an average frequency is determined for the identified comment groups, and frequency-based minimum and maximum inclusion thresholds are determined based in part on the average frequency. As one example, the standard deviation (not shown) may be further determined for the frequency values, and the minimum and maximum inclusion thresholds may be determined based in part on the standard deviation. In this example, the lines 255*a* and 255*b* in section 255 denote the lines for the maximum and minimum inclusion thresholds, respectively. Accordingly, a term such as "the" is excluded in this example as being too ubiquitous or general for the category, and a term such as "Chip Kelly" is excluded as being too rare or specific (or irrelevant) for the category. The topics or other attributes of the remaining identified comment groups may then be identified as topics that are relevant to the "President Obama" category for this time period, including topics such as "Obama," "President," "democrat," "inauguration," "debt limit," and "republican," as well as geographical location attributes "Washington D.C." and "Chicago"—while no author user attributes or comment data source attributes are illustrated in this example, it will be appreciated that such attributes may similarly be identified and included. It will further be appreciated that some of the identified topics for this category may be fairly constant over different time periods (e.g., "President" and "democrat"), while other identified topics may change over time to reflect subject matter that is or is not of sufficient current interest at a given time (e.g., such that "inauguration" and/or "debt limit" may not be included in this category during some time periods).

Figure 2D:

FIG. 2D continues the examples of FIGS. 2A-2C, and includes information about quantifying information about the user comments included in a comment group or about the user comments associated with a content category, and about using the quantified information to predict information about additional user comments that are expected to be received. In particular, FIG. 2D illustrates a histogram graph 260 that may be constructed to represent information about such user comments for a time window, with each time period of a defined length (e.g., 30 minutes) having a distinct value for the histogram. In this example the histogram is constructed using 30 prior time periods (for a time window of 15 hours), although in other embodiments a time window of other lengths may be used (e.g., 24 hours, 48 hours, 72 hours, etc.). If the histogram 260 corresponds to a particular comment group, such as the "inauguration" comment group that is one of the determined comment groups for the "President Obama" content category discussed in FIG. 2C, the shape of the histogram may reflect that interest in a distributed group discussion involving the inauguration topic has recently increased, but may recently be decreasing over the last 3 time periods. Such quantified information may provide various types of benefits to various entities, such as people planning for attendance at inauguration-related activities, companies that are offering products or services affected by inauguration-related activities, news organizations or other entities that track interest in political topics, etc., particularly if the quantified information is available in a real-time or near-real-time manner with respect to the underlying user comments (e.g., within minutes or hours).

While such quantified information may be of use to reflect recent events and status, such quantified information may further be used to predict information about additional user comments that are expected to be received, including changes with respect to topics that are part of a category, and/or changes with respect to how many, when, where and by whom that expected future user comments will be received for a particular comment group or content category. FIG. 2D further illustrates one example of how such prediction may be performed based on the histogram graph 260, which involves matching the histogram graph 260 to a defined prediction template 265. The prediction template 265 may, for example, be one of multiple defined prediction templates that are available to be used, with some or all such defined prediction templates being based at least in part on prior actual user comments have been received. In particular, in this example, a portion 260*a* of the histogram graph 260 is matched to a corresponding portion 265*a* of a prediction histogram that is part of the template 265—such matching may be performed in various manners, such as by measuring differences for values for corresponding time periods in the two histograms being compared, or more generally using techniques to compare two curves or other shapes. It will be appreciated that the matching of a histogram graph to a prediction template may be performed in a variety of manners in various embodiments. A non-exclusive list of techniques that may be used as part of the matching includes the following: root-mean-square ("RMS") error or deviation; vector inner product; absolute difference; information-theoretic measures (e.g., the Kullback-Leibler divergence); etc. In addition; in some embodiments, the prediction templates are selected in a manner that is not specific to particular categories and/or comment groups, such as to instead identify and use patterns over time that are repeatedly observed across comment groups and/or categories (e.g., by promoting and using the prediction templates that are successful over time, while decreasing and removing the use of prediction templates that are not successful). Furthermore, in some embodiments and situations, a histogram template of a given length of time (e.g., 72 hours) with data points for each time period of interest (e.g., 30 minutes) may consider one or more prediction templates with respect to each data point (e.g., with each such prediction template being for the same given length of time).

Based on the match to portion 265*a* of prediction template 265, some or all of the additional portion 265*b* of the prediction template 265 may be used to predict additional expected future comments that will be received for the comment group or category represented by histogram graph 260, such as after any appropriate scaling is performed. In particular, in this example, the additional portion 265*b* of the prediction template 265 may be used to predict that the quantity of user comments will continue to fall for five more time periods, and to then level off for about eight additional time periods, after which the quantity will rise again somewhat before gradually decreasing. It will be appreciated that a variety of types of shapes may be represented by prediction templates in a variety of manners, such as to reflect a variety of types of distributed group behavior related to an underlying discussion that is occurring.

By generating such quantified information for each determined comment group for a content category, and by predicting additional corresponding information for each such comment group, a variety of types of information may be determined for the content category. As one example, if the quantity of comments that are predicted to occur for a first comment group decreases sufficiently, while the comments that are predicted to occur for a second comment group increases, the increasing influence of the topic for the second comment group to the content category may be determined. In addition, the time at which a particular topic will stop and/or start being a sufficiently relevant topic for a content category may be predicted. Based on such information, the GDP service or a client that receives such information may be able to take various types of corresponding actions, such as to reduce or stop activities related to topics that are losing relevance, to increase or start activities to try to increase interest in a topic of importance that is otherwise losing relevance, to target additional activities related to topics that are increasing in relevance, etc. In addition, when such quantified information is generated for geographical location attributes, comment data source attributes, and/or author user attributes that are determined topics for a content category, and when additional corresponding expected future information is predicted for such attribute-based comment groups, a variety of additional types of information may be determined for the content category. For example, not only can relative differences be determined in the relevance of different topics to a category, but such differences can similarly be tracked and predicted across different geographical areas (e.g., this topic is increasing in relevance in location A, but remaining constant in location B), different comment data sources, and/or different author users. Differences across other types of attributes may similarly be tracked and predicted, and such information about attribute-based comment groups may similarly be used by the GDP service or a client that receives such information to take various types of corresponding actions.

Figure 2E:
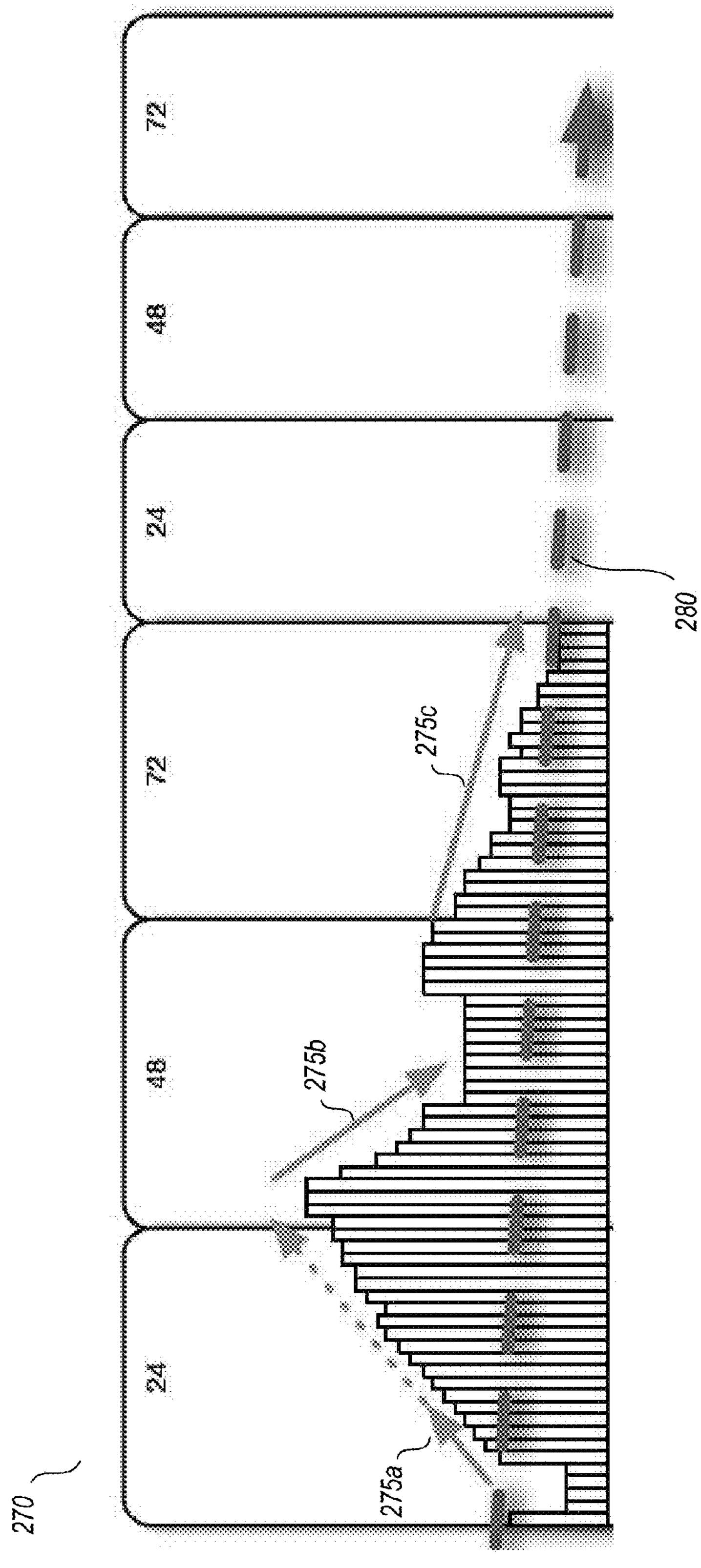

FIG. 2E continues the examples of FIGS. 2A-2D, and includes additional information about using quantified information to predict information about additional user comments that are expected to be received. In particular, FIG. 2D provided an example of performing prediction based on a defined prediction template that is determined to sufficiently match a generated histogram. In other embodiments or situations, such as when no such defined prediction templates exist or sufficiently match the generated histogram, prediction activities may be performed for a generated histogram in other manners, with FIG. 2E providing additional details about one such example of other prediction activities.

FIG. 2E illustrates a histogram graph 270 that is similar to graph 260 of FIG. 2D, but that includes data for additional time periods, and in particular corresponds to a 72-hour sliding time window of prior time periods. In order to predict additional future user comments that will be received based on the existing actual comments that have been received during the time window, a trend line 280 is determined from the existing data in the generated histogram, and is projected across one or more future time periods of interest (in this example over a future period of at least 24 hours). While particular future values are not individually illustrated, they can be easily determined for a particular future time period from such a prediction trend line. It will be appreciated that trend lines may be generated in various manners in various embodiments, and that a $2^{nd}$ degree polynomial least squares fit may be used in at least some embodiments to generate such a prediction trend line—in addition, while the trend lines illustrated in FIG. 2E are linear, in other embodiments and situations such trend lines that are generated and used may have a variety of other shapes (e.g., various types of curves, such as based on higher-order polynomials used with least squares fit, or otherwise based on exponential and/or weighted techniques). In addition, in some embodiments a minimum threshold may be established for having sufficient data to generate such trend line predictions, such as a minimum quantity in one or more time periods and/or a minimum number of time periods with quantified values, such that the trend line prediction may not be performed until the sufficient data threshold is reached.

In addition to using a trend line prediction to generate prediction information for future time periods, the same or similar types of trend line prediction information may be used to assist in generating new defined prediction templates. For example, considering the histogram graph 270, various portions of the histogram graph may be selected for additional analysis, such as the last 24 hours (the portion labeled "72" that includes histogram data), the last 48 hours (the portions labeled "48" and "72" that include histogram data), the first 24 hours (the portion labeled "24" that includes histogram data), the first 48 hours (the portions labeled "24" and "48" that include histogram data), etc. For each such portion of the histogram, a prediction trend line may be generated based on the data in that portion, and the subsequent portions of data about actual user comments may be used to determine if the prediction trend line accurately predicted information about those actual user comments. If the prediction trend line for a portion of the histogram does accurately predict such information, that portion of the histogram may be selected to be used or evaluated as a prediction template for performing future predictions, and/or that portion of the histogram plus the later actual matching predicted data may be selected for use as such a prediction template. In the example of FIG. 2E, a prediction trend line 275*a* has been generated to correspond to the portion of the histogram for the first 24 hours, a prediction trend line 275*b* has been generated to correspond to the portion of the histogram for the second 24 hours, and a prediction trend line 275*c* has been generated to correspond to the portion of the histogram for the third (or last) 24 hours, although neither of the prediction trend lines 275*a* and 275*b* appear to accurately predict data for the next 24 hour period in this example. When evaluating a prediction trend line that uses the most recent actual data (e.g., trend lines 275*c* or 280), the evaluation based on actual data may be deferred until a future time when that actual data is available, such as after an additional 24 hours have passed. It will be appreciated that such matching of a predicted trend line to actual user comment data may be performed in various manners, such as by measuring differences for values for one or more time periods between the predicted values and the actual values, or more generally using techniques to compare two curves or other shapes. It will also be appreciated that the matching of a trend line to a histogram graph may be performed in a variety of manners in various embodiments, including in some embodiments to use techniques similar to those previously described with respect to matching histogram graphs and prediction templates.

It will be appreciated that the details discussed with respect to the examples of FIGS. 2A-2E are provided for illustrative purposes, and that the described techniques may be used with a variety of other types of user-supplied information and may be performed in a variety of other ways.

Figure 3:
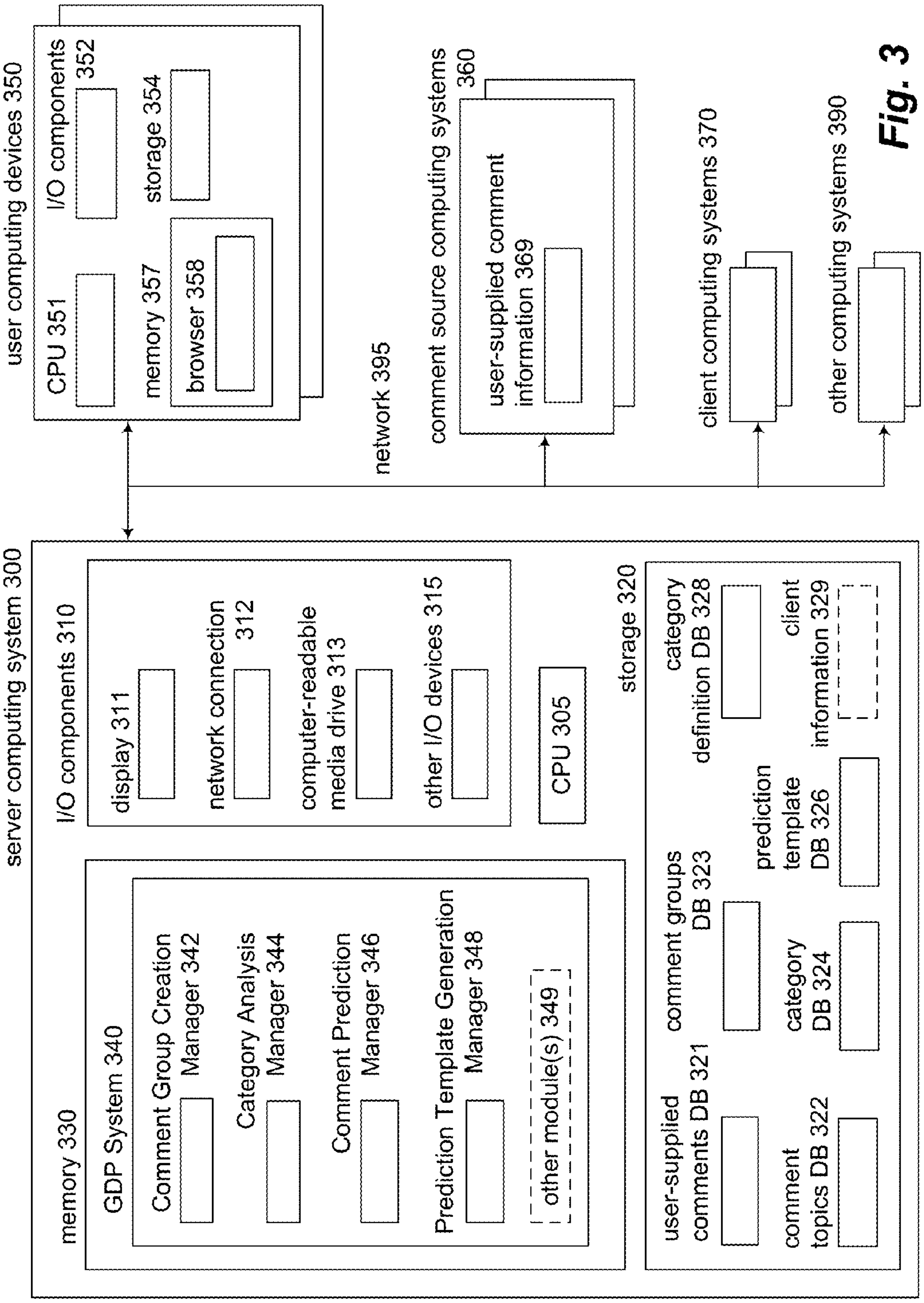
FIG. 3 is a block diagram illustrating a computing system suitable for executing embodiments of a described system for analyzing distributed group discussions and predicting further aspects of the discussions.

FIG. 3 is a block diagram illustrating an embodiment of a server computing system 300 that is suitable for performing at least some of the described techniques, such as by executing an embodiment of a Group Discussion Prediction ("GDP") system 340 that provides a group discussion prediction service. The example server computing system 300 includes one or more central processing unit ("CPU") processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.).

The user computing devices 350 are similarly illustrated as each having one or more CPU processors 351, one or more I/O components 352, memory 357, and storage 354, although particular I/O components and stored information is not illustrated. The other computing systems 360, 370 and 390 may similarly include some or all of the same types of components as the server computing system 300, but such components are not illustrated in this example for the sake of brevity. The server computing system 300, the GDP system 340 and the system 340 modules may also communicate with such other computing devices and systems in various manners, including via one or more networks 395 (e.g., the Internet, one or more cellular telephone networks, etc.).

In the illustrated embodiment, the GDP system 340 is executing in memory 330, and in this example includes several modules, including a Comment Group Creation Manager module 342, a Category Analysis Manager module 344, a Comment Prediction Manager module 346, a Prediction Template Generation Manager module 348, and optionally one or more other modules 349. The system 340 and/or the system modules may in some embodiments include software instructions that, when executed, program or otherwise configure the processor(s) 305 and the server computing system(s) 300 to perform automated operations that implement at least some of the described techniques.

The GDP system 340 and its modules may obtain and use various information as part of its automated operations, such as to obtain user-supplied textual comments or other user-supplied content items from information 369 on one or more comment source computing systems 360 (e.g., computing systems that support one or more social networking sites or other available sites with user-supplied information) and/or from other computing systems (e.g., directly from computing devices 350 of users who supply the information, from other external computing systems 390, etc.), and may store such obtained information in a comment information database 321 on storage 320. The content items supplied to the computing systems 360 and/or 390 may originate from, for example, human users interacting with their user client computing devices 350, such as via a Web browser 358 executing in memory 357 of the client device, or via other software applications (not shown) executing on the client device.

In addition, the GDP system 340 may optionally obtain various types of client-related information from users or other entities that act as clients of the GDP system 340, such as by interacting with corresponding client computing systems 370 (e.g., via a corresponding optional module 349 that enables clients to register with the system 340 and/or to provide other types of client-specific information), and may store some or all such information in optional client information database 329 on storage 320. In at least some embodiments, some or all of the category definition information in database 328 may similarly be received from clients, such as to analyze information about a particular specified content category on behalf of a client who specifies a definition and/or other information about the content category. When such clients exist, the GDP system 340 may further provide various types of information to the clients (e.g., by sending the information to the client computing systems 370), and/or take various other types of automated actions on behalf of such clients, such as in accordance with specified client instructions or other specified criteria. While not illustrated here, in other embodiments some or all of the GDP system 340 may execute on behalf of a single client or a single entity (e.g., an organization with multiple employees or other members).

The Comment Group Creation Manager module 342 may perform automated operations to analyze various user-supplied textual comments or other user-supplied content items that have been supplied for one or more time periods (e.g., as may be stored in database 321 on storage 320 or in one or more other locations), such as to group content items based on common topics in their contents or based on other comment attributes that they share, and to optionally store corresponding comment topic information in database 322 on storage 320 and comment group information in database 323 on storage 320.

The Category Analysis Manager module 344 may perform automated operations to determine topics or other attributes that are associated with a specified content category for one or more time periods, such as by identifying particular comment groups that are relevant for the specified content category for one or more time periods based on user-supplied comments or other content items included in those comment groups. In doing so, the module 344 may use information stored in comment information database 321, comment group database 323, comment topic database 322, and category definition database 328 stored on storage 320, and may store corresponding determined category information in category information database 324 stored on storage 320.

The Comment Prediction Manager module 346 may perform automated operations to quantify user-supplied comments or other content items that are associated with particular comment groups and categories, and to use such quantified information for a category or comment group to predict information about additional user-supplied comments or other content items that are expected to be supplied for the category and/or comment group. In some situations, the predictions are performed by generating prediction trends, and in other situations the predictions are performed using previously generated prediction templates. In doing so, the module 346 may use information stored in comment group database 323, category information database 324 and/or prediction template database 326 stored on storage 320, and may store quantified information about content items associated with particular comment groups and categories in comment group database 323 and/or category information database 324, and may store corresponding generated prediction information in comment group database 323 and category information database 324 (or instead in one or more other prediction information databases, not shown, in other embodiments).

The Prediction Template Generation Manager module 348 may use quantified information about supplied comments or other content items associated with a category and/or with comment groups, and/or may use predicted information about additional user-supplied comments or other content items that are expected to be supplied for the category and/or comment groups, such as to identify or generate a histogram or other template of information that accurately reflects comments or other content items actually supplied for a category and/or comment groups, and that may be used as a template to predict information about additional user-supplied comments or other content items that are expected to be supplied for the category and/or comment groups. In doing so, the module 348 may use information stored in comments database 321, comment group database 323, and/or category information database 324, stored on storage 320, and may store corresponding new prediction templates in prediction template database 326.

It will be appreciated that the illustrated computing systems are merely illustrative and are not intended to limit the scope of the present invention. For example, computing system 300 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate intercommunication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in. other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems including software instructions that, when executed by the CPU(s) 305 or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
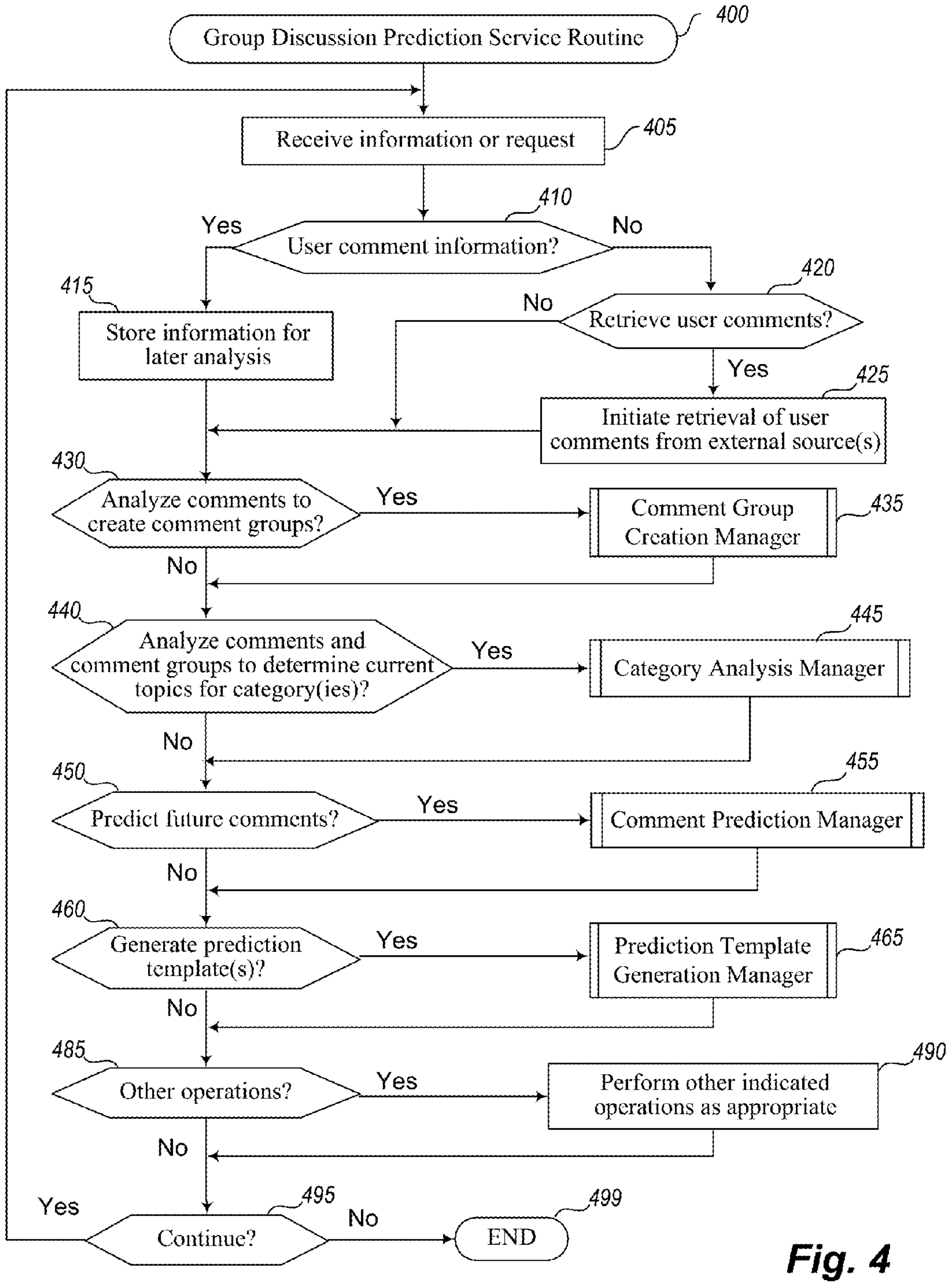
FIG. 4 is an example flow diagram of an illustrated embodiment of a Group Discussion Prediction Service routine.

FIG. 4 is an example flow diagram of an illustrated embodiment of a Group Discussion Prediction Service routine 400. The routine may be provided by, for example, execution of an embodiment of the Group Discussion Prediction Service 150 of FIG. 1, the group discussion prediction service discussed with respect to FIGS. 2A-2E and/or the Group Discussion Prediction ("GDP") system 340 of FIG. 3, such as to analyze distributed group discussions and to predict future characteristics of such discussions. While the illustrated embodiment of the routine may analyze particular aspects of distributed group discussions with respect to particular metrics, such as a quantity of user comments received with respect to a particular topic or category, it will be appreciated that other aspects and/or metrics may be used in other embodiments. In addition, while the illustrated embodiment of the routine discusses obtaining and analyzing user comments, it will be appreciated that other types of user-supplied content items may be obtained and analyzed in other embodiments, whether instead of or in addition to user comments.

The routine begins at block 405, where information or a request is received. The routine continues to block 410 to determine if information has been received about one or more user comments (or other user-supplied content items), such as for user comments that have recently or concurrently been supplied to one or more comment sources and sent to the routine 400 by the comment source(s) (e.g., in response to one or more previous requests from the routine 400, such as with respect to blocks 425 or 490). If so, the routine continues to block 415 to store some or all of the received information for later analysis. If it is instead determined in block 410 that the received information or request of block 405 is not user comment information, the routine continues instead to block 420 to determine to retrieve user comments (or other user-supplied content items) from one or more external comment sources, such as to do so on a periodic basis or when the information is needed for a corresponding analysis. If so, the routine continues to block 425 to initiate the retrieval of user comments (or other user-supplied content items) from one or more external comment sources, such as one or more social networking services or other publicly accessible sites at which users may supply information. In the illustrated embodiment, the retrieval of the user comments in block 425 is performed in an asynchronous manner, by initiating requests to those external comment sources and later receiving corresponding responses, although in other embodiments the routine may instead complete the retrieval of particular user comments from particular comment sources in block 425 before continuing.

After blocks 415 or 425, or if it is instead determined in block 420 that the information or request received in block 405 is not to retrieve user comments, the routine continues to block 430. In block 430, the routine determines whether the information or request received in block 405 is to analyze user comments (or other user-supplied content items) to create corresponding comment groups, such as for information just received with respect to block 415 (e.g., for a current time period), or instead for a prior time period of a specified length (e.g., 30 minutes). If so, the routine continues to block 435 to execute a Comment Group Creation Manager routine to perform the analysis and creation of the comment groups, with one example of such a routine being described in greater detail with respect to FIG. 5.

After block 435, or if it is instead determined in block 430 that the information or request received in block 405 is not to analyze comments, the routine continues to block 440 to determine whether the information or request received in block 405 is to analyze user comments (or other user-supplied content items) and comment groups to determine current topics for one or more categories and one or more time periods, optionally with respect to comment groups that were just created in block 435 and/or for user comments just received in block 415. If so, the routine continues to block 445 to execute a Category Analysis Manager routine to determine the current topics for the category(ies) for the one or more time periods, with one example of such a routine being described in greater detail with respect to FIG. 6.

After block 445, or if it is instead determined in block 440 that the information or request received in block 405 is not to determine current topics for one or more categories, the routine continues instead to block 450 to determine whether the information or request received in block 405 is to predict information about future user comments (or other user-supplied content items) that are expected to be received for one or more comment groups and/or categories, such as for one or more future time periods, and optionally based on comment groups that were just created in block 435 and/or for user comments just received in block 415 and/or for category information that was just determined in block 445. If so, the routine continues to block 455 to execute a Comment Prediction Manager routine to quantify one or more aspects of the user comments (or other user-supplied content items) for the comment groups and/or the category (ies), and to generate corresponding predictions based on such quantified information, with one example of such a routine being described in greater detail with respect to FIGS. 7A and 7B.

After block 455, or if is instead determined in block 450 that the information or request received in block 405 is not to predict information about future user comments, the routine continues instead to block 460 to determine whether the information or request received in block 405 is to generate one or more prediction templates based on prior distributed group discussions and corresponding analyses. Such generation of one or more prediction templates may be performed, for example, with respect to information about actual user comments (or other user-supplied content items), comment groups and categories determined in blocks 435 and/or 445, and/or with respect to information about future comments (or other user-supplied content items) that are predicted in block 455. If so, the routine continues to block 465 to execute a Prediction Template Generation Manager routine to generate one or more such prediction templates, with one example of such a routine being described in greater detail with respect to FIG. 8.

After block 465, or if it is instead determined in block 460 that the information or request received in block 405 is not to generate prediction templates, the routine continues instead to block 485 to determine whether a request corresponding to one or more other operations has been received. If so, the routine continues to block 490 to perform one or more other indicated operations as appropriate. Such other indicated operations may include, for example, one or more of the following non-exclusive list: receiving and storing definitions and other information about categories of interest; receiving and storing information about particular comment sources of interest (e.g., how to obtain comments or other user-supplied content items from them, timing for obtaining comments or other user-supplied content items from them, types of comments or other user-supplied content items available from them, etc.); receiving and storing information about clients of the service (e.g., categories of interest to the client, criteria under which to notify the client of discussion predictions and/or current discussion information of interest, types of automated actions to take under specified circumstances with respect to one or more categories of interest, etc.); etc.

After block 490, or if it is instead determined in block 485 that the information or request received in block 405 is not to perform other indicated operations, the routine continues instead to block 495 to determine whether to continue, such as until an explicit indication to terminate is received. If it is determined to continue, the routine returns to block 405, and otherwise continues to block 499 and ends. In at least some embodiments, the routine may execute in a continuous or near-continuous manner, such as to gather and store information about comments (or other user-supplied content items) as they become available, and to analyze such user comment information during each time period of an indicated length (e.g., every 30 minutes).

Figure 5:
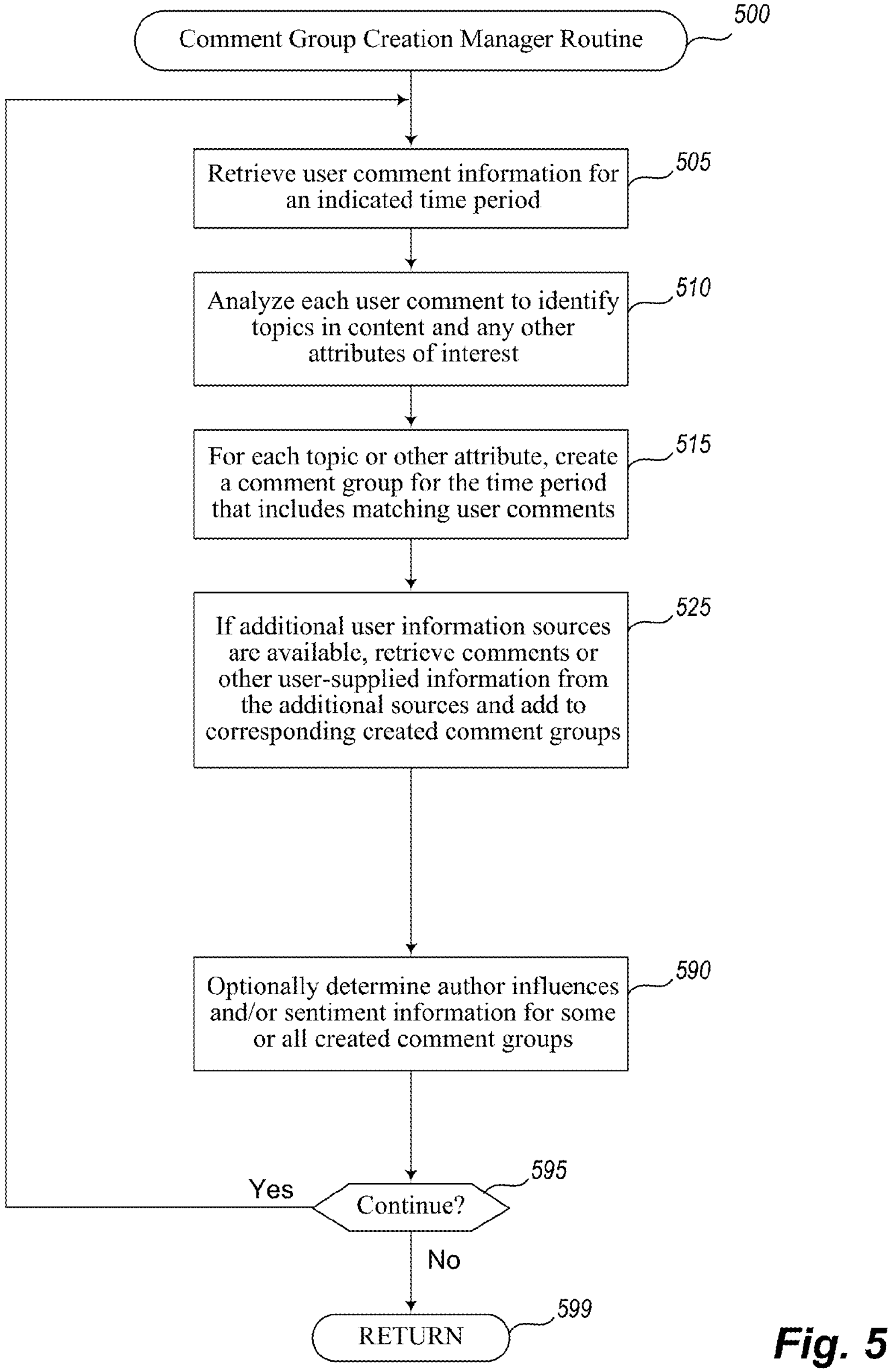
FIG. 5 is an example flow diagram of an illustrated embodiment of a Comment Group Creation Manager routine.

FIG. 5 is an example flow diagram of an illustrated embodiment of a Comment Group Creation Manager routine 500. The routine may be performed by, for example, execution of the Comment Group Creation Manager module 342 of FIG. 3, the group discussion prediction service discussed with respect to FIGS. 2A-2E and/or the Group Discussion Prediction Service 150 of FIG. 1, such as to analyze user comment information that has been received for a particular time period in order to create corresponding comment groups. The routine may be invoked in various manners in various embodiments and situations, including with respect to block 435 of FIG. 4. In addition, while the illustrated embodiment of the routine discusses obtaining and analyzing user comments, it will be appreciated that other types of user-supplied content items may be obtained and analyzed in other embodiments, whether instead of or in addition to user comments.

The illustrated embodiment of the routine begins at block 505, where user comment information for an indicated time period is retrieved, such as for information received and stored with respect to block 415 of FIG. 4. The routine then continues to block 510 to analyze each user comment to identify any topics of interest in the content and/or any other attributes of interest corresponding to the comment, such as a location of where the comment was submitted from, an author user who generated or otherwise supplied the user comment, a comment data source from which the user comment was obtained, any n-grams in the contents of the user comment (including any hashtags), etc.

After block 510, the routine continues to block 515 to, for each topic or other attribute that is identified in any of the user comments, create a corresponding comment group for the indicated time period that includes user comments matching that topic or other attribute for that time period. The routine then continues to block 525 to, if additional user information sources are available, retrieve additional comments or other user-supplied information from the additional sources that correspond to the topic or other attribute for each created comment group, and to add any such additional retrieved user-supplied information to the corresponding created comment groups. The comment group information is then stored for later use.

In some embodiments, the routine may further perform additional optional activities with respect to block 590, to determine additional information about some or all of the created comment groups, such as to analyze the user comments included in some or all comment groups to determine particular author users who have high or low influence for the comment group (e.g., relative to other author users for the same comment group and/or for other comment groups), to analyze the user comments included in some or all comment groups to enable performance of a sentiment analysis with respect to contents of the comments, etc. Information generated by such optional additional activities may be stored and/or used in various manners, including to provide some or all of the generated information to clients, to take additional automated actions based on the generated information, to use some or all of the generated information as part of other analyses and determinations performed by the group discussion prediction service, etc. Additional details related to such additional optional activities are discussed in greater detail elsewhere.

After block 590, the routine continues to block 595 to determine whether to continue, such as until an explicit indication to terminate is received. If it is determined to continue, the routine returns to block 505, such as to wait until the next time period of an indicated length is completed, or until corresponding user comment information for such a next time period is available. If it is determined in block 595 to not continue, the routine continues to block 599 and returns, such as to return to block 435 of FIG. 4.

Figure 6:
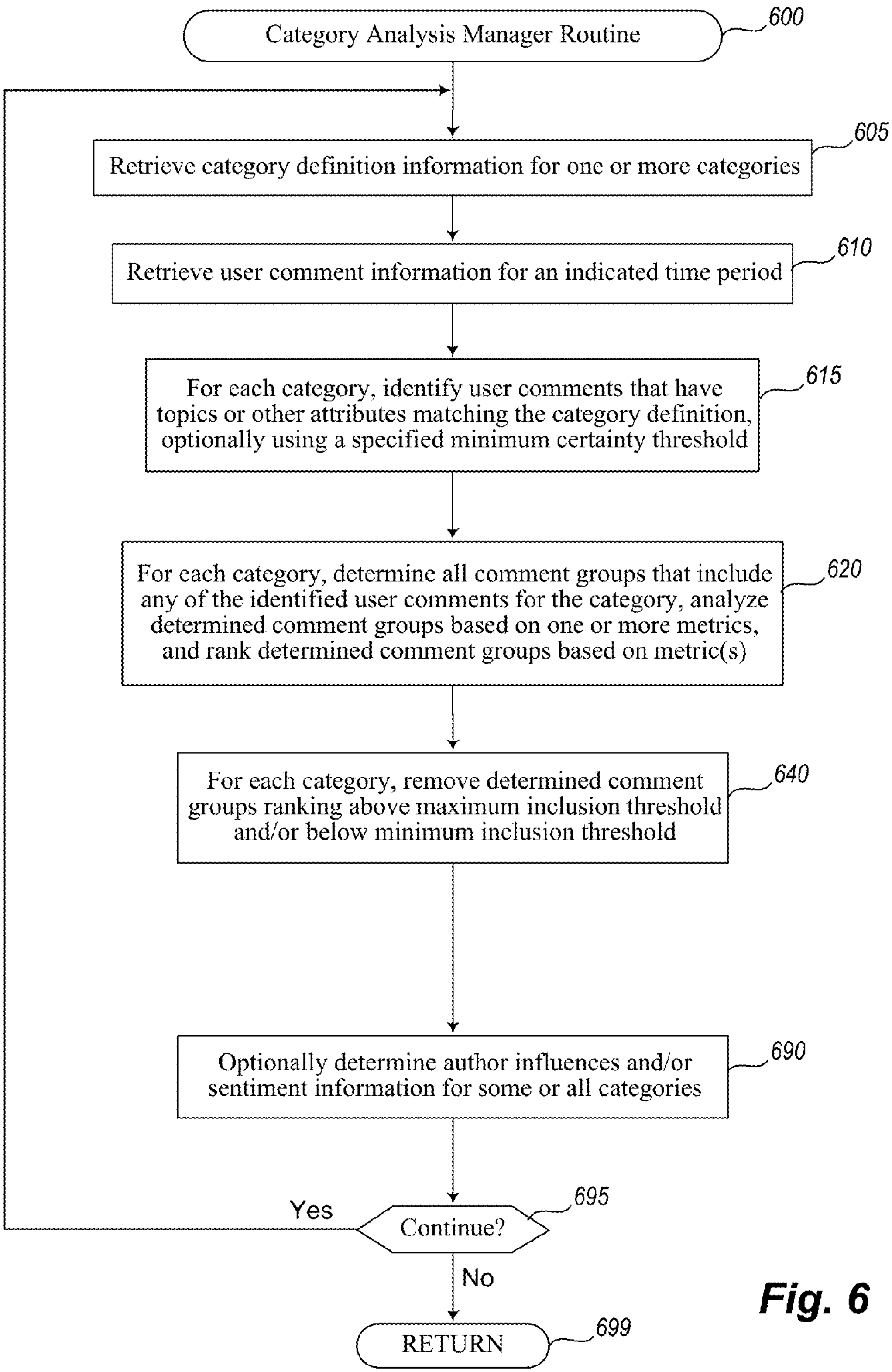
FIG. 6 is an example flow diagram of an illustrated embodiment of a Category Analysis Manager routine.

FIG. 6 is an example flow diagram of an illustrated embodiment of a Category Analysis Manager routine 600. The routine may be performed by, for example, execution of the Category Analysis Manager module 344 of FIG. 3, the group discussion prediction service discussed with respect to FIGS. 2A-2E and/or the Group Discussion Prediction Service 150 of FIG. 1, such as to analyze information about comments received during an indicated time period in order to identify current topics that are most relevant for the category during the time period. The routine may be invoked in various manners in various embodiments and situations, including with respect to block 445 of FIG. 4. In addition, while the illustrated embodiment of the routine discusses analyzing user comments, it will be appreciated that other types of user-supplied content items may be obtained and analyzed in other embodiments, whether instead of or in addition to user comments.

The illustrated embodiment of the routine begins at block 605, where category definition information is retrieved for one or more categories of interest. In block 610, the routine then retrieves user comment information for an indicated time period. In block 615, the routine then, for each category of interest, identifies user comments that have topics or other attributes matching the definition for the category, optionally using a specified minimum certainty threshold. As one example, in some embodiments a category definition may include one or a small number (e.g., four) of definition terms, and a user comment is identified as satisfying the category definition if it includes at least one of those definition terms, while in other embodiments the user comment may need to include all of the indicated definition terms or a specified minimum number of the definition terms to satisfy the minimum certainty threshold with respect to the category.

After block 615, the routine continues to block 620 to, for each category of interest, determine all the comment groups that include any of the user comments that were identified for the category, and to then analyze those determined comment groups based on one or more metrics. After the analysis, the determined comment groups are ranked with respect to the one or more metrics. As one example, the metrics may include the frequency in which comments of each determined comment group appear in the identified user comments for the category, such as to assess a relevance of each comment group to the category. The analysis of the determined comment groups based on the metric(s) may further include, in at least some embodiments, determining an average and a standard deviation with respect to the frequencies for the determined comment groups.

After block 620, the routine continues to block 640 to determine information about a maximum inclusion threshold and/or a minimum inclusion threshold for each category, such as in some embodiments to be based on the information about the determined average frequency for determined comment groups of the category and standard deviation information (e.g., to have the maximum inclusion threshold be one-half of the standard deviation above the average, and/or to have the minimum inclusion threshold be one-half of the standard deviation below the average frequency). After the maximum inclusion threshold and/or minimum inclusion threshold are determined, the determined comment groups for each category that are above the maximum or below the minimum inclusion thresholds are removed from the category, with the remaining determined comment groups reflecting current topics and other attributes that are currently most relevant for the category. Information about the determined comment groups for the category is then stored for later use. In some embodiments, only one of a maximum inclusion threshold and a minimum inclusion threshold may be used.

In some embodiments, the routine may further perform additional optional activities with respect to block 690, to determine additional information about some or all of the categories, such as to analyze the user comments associated with the category to determine particular author users who have high or low influence for the category (e.g., relative to other author users for the same category and/or for other categories), to analyze the user comments associated with the category to enable performance of a sentiment analysis with respect to contents of the user comments, etc. Information generated by such optional additional activities may be stored and/or used in various manners, including to provide some or all of the generated information to clients, to take additional automated actions based on the generated information, to use some or all of the generated information as part of other analyses and determinations performed by the group discussion prediction service, etc. Additional details related to such additional optional activities are discussed in greater detail elsewhere.

After block 690, the routine continues to block 695 to determine whether to continue, such as until an explicit indication to terminate is received. If it is determined to continue, the routine returns to block 605, such as to wait until the next time period of an indicated length is completed, or until corresponding comment group information for such a next time period is available. If it is determined in block 695 to not continue, the routine instead continues to block 699 and returns, such as to return to block 445 of FIG. 4.

Figure 7A:
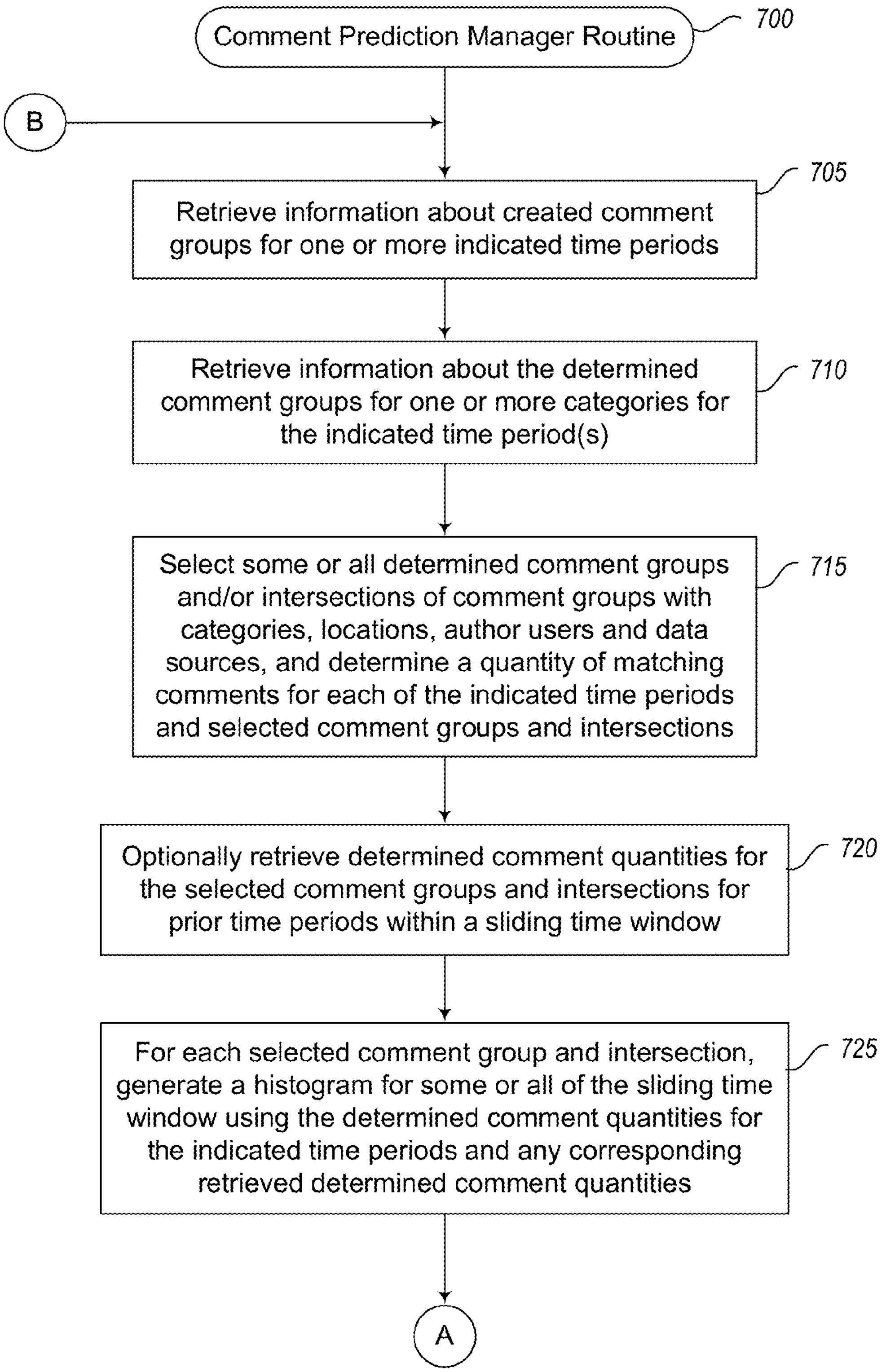
FIGS. 7A-7B are an example flow diagram of an illustrated embodiment of a Comment Prediction Manager routine.
Figure 7B:
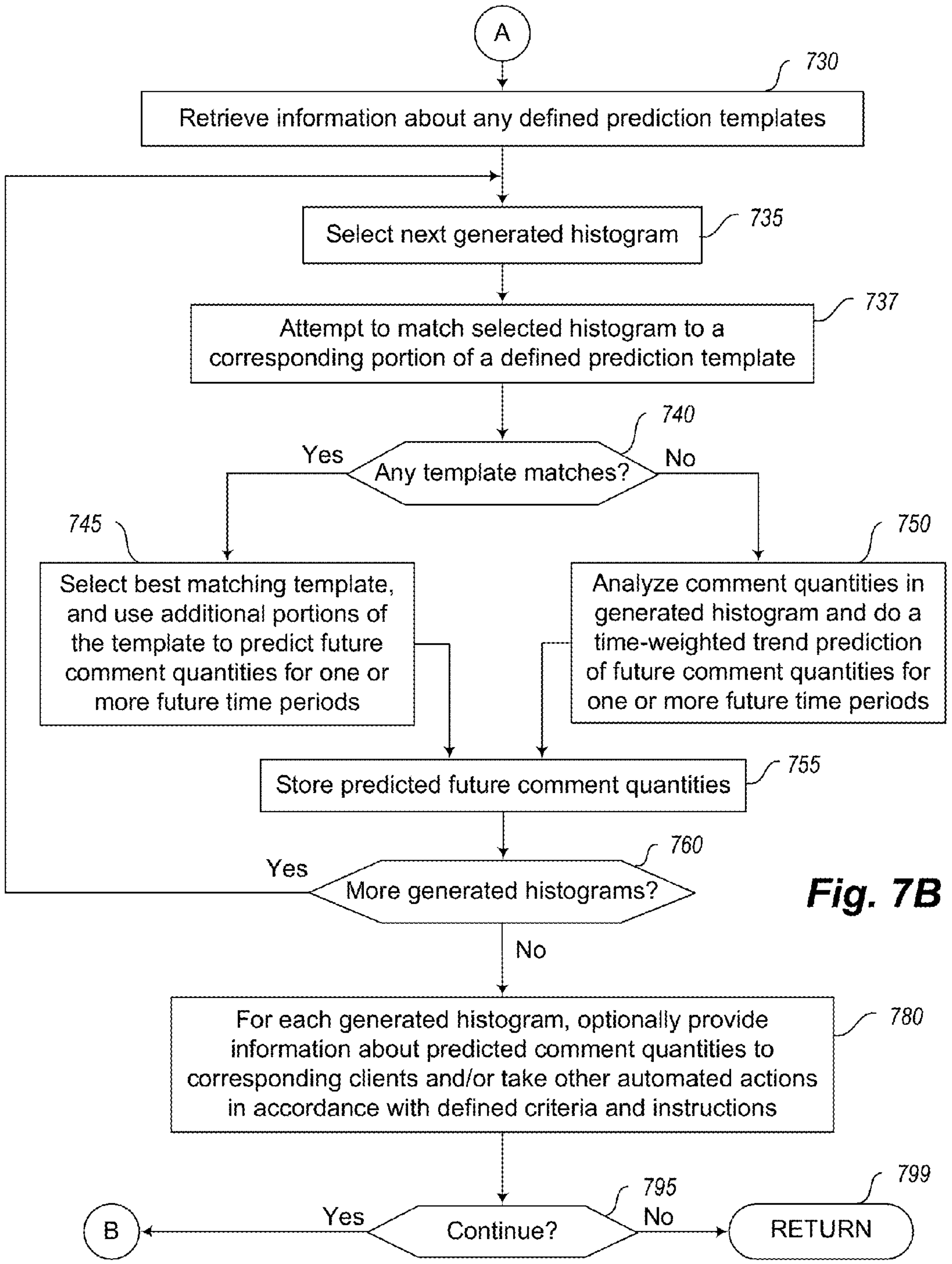

FIGS. 7A and 7B are an example flow diagram of an illustrated embodiment of a Comment Prediction Manager routine 700. The routine may be performed by, for example, execution of the Comment Prediction Manager module 346 of FIG. 3, the group discussion prediction service discussed with respect to FIGS. 2A-2E and/or the Group Discussion Prediction Service 150 of FIG. 1, such as to predict information about future user comments that will be received with respect to one or more comment groups and/or categories for one or more future time periods based at least in part on comment information for those comment groups and/or categories that have already been received. The routine may be invoked in various manners in various embodiments and situations, including with respect to block 455 of FIG. 4. In addition, while the illustrated embodiment of the routine discusses analyzing user comments, it will be appreciated that other types of user-supplied content items may be obtained and analyzed in other embodiments, whether instead of or in addition to user comments.

The illustrated embodiment of the routine begins at block 705, where information is retrieved about created comment groups for one or more indicated time periods. In block 710, information is then retrieved about the comment groups that have been determined to be relevant for one or more categories for the indicated time periods. After block 710, the routine continues to block 715 to select some or all of the determined comment groups for further analysis, including in some embodiments to select some or all intersections of the determined comment groups with corresponding categories, locations, author users, and/or data sources. For each selected comment group and/or intersection, the routine in block 715 then quantifies information about the associated user-supplied comments for the selected comment group and/or intersection, such as by determining a quantity of matching comments for each of the indicated time periods of interest. The routine then continues to block 720 to optionally retrieve additional determined comment quantity information for the selected comment groups and/or intersections, such as for prior time periods within a sliding time window (e.g., the last 72 hours).

In block 725, the routine then, for each selected comment group and intersection, generates a histogram for some or all of the sliding time window using the determined comment quantities for the indicated time periods and any corresponding retrieved determined comment quantities for prior time periods, such as to have a separate value in the histogram for each time period of an indicated length during the sliding time window (and optionally removing any information from a previous histogram for time periods that are no longer part of the sliding time window).

After block 725, the routine continues to block 730 to retrieve information about any defined prediction templates that are available for use in performing predictions. The routine then continues to block 735 to select the next generated histogram, beginning with the first. In block 737, the routine then attempts to match the selected generated histogram to one or more of the defined prediction templates. In block 740, it is determined if any of the prediction templates had a sufficient match for the selected histogram, and if so, the routine then continues to block 745 to select the best matching prediction template, and to use additional portions of the prediction template to predict future comment quantities for one or more future time periods corresponding to the selected histogram. If it is instead determined in block 740 that there were not any matching prediction templates (or no prediction templates were available to attempt to match), the routine continues instead to block 750 to perform a time-weighted trend prediction of future comment quantities for one or more future time periods based on the comment quantities in the generated histogram. It will be appreciated that the matching of a histogram to a prediction template, the use of an additional portion of a matching template to predict future quantities, and the time-weighted trend prediction may each be performed in various manners in various embodiments, as discussed in greater detail elsewhere.

After blocks 745 or 750, the routine continues to block 755 to store the predicted future comment quantity information for subsequent use. In block 760, it is then determined if any additional histograms generated in block 725 remain to be analyzed, and if so returns to block 735 to select a next such generated histogram. Otherwise, the routine continues to block 780 to optionally perform one or more additional activities. Such additional activities may, in at least some embodiments, include providing information about predicted comment quantities and/or about determined current quantities for a generated histogram to one or more corresponding clients or other information sources that previously requested such information, optionally in accordance with any specified criteria by such clients or other information sources. In addition, in at least some embodiments, the routine may, in block 780, further take one or more other automated actions for a generated histogram in accordance with defined criteria and client instructions based at least in part on predicted comment quantities and/or on determined current comment quantities, such as to initiate and add one or more comments to one or more comment sources that include information relevant to a discussion for a category or a comment group associated with the generated histogram (e.g., to provide additional information corresponding to the category or to the topic of the comment group, or to otherwise influence a direction in which the discussion may take place in the future).

After block 780, the routine continues to block 795 to determine whether to continue, such as until an explicit indication to terminate is received. If it is determined to continue, the routine returns to block 705, such as to wait until the next time period of an indicated length is completed, or until corresponding to wait until additional information about created comment groups and/or about determined comment groups for categories for such a next time period is available. If it is instead determined in block 795 not to continue, the routine instead continues to block 799 and returns, such as to return to block 455 of FIG. 4.

Figure 8:
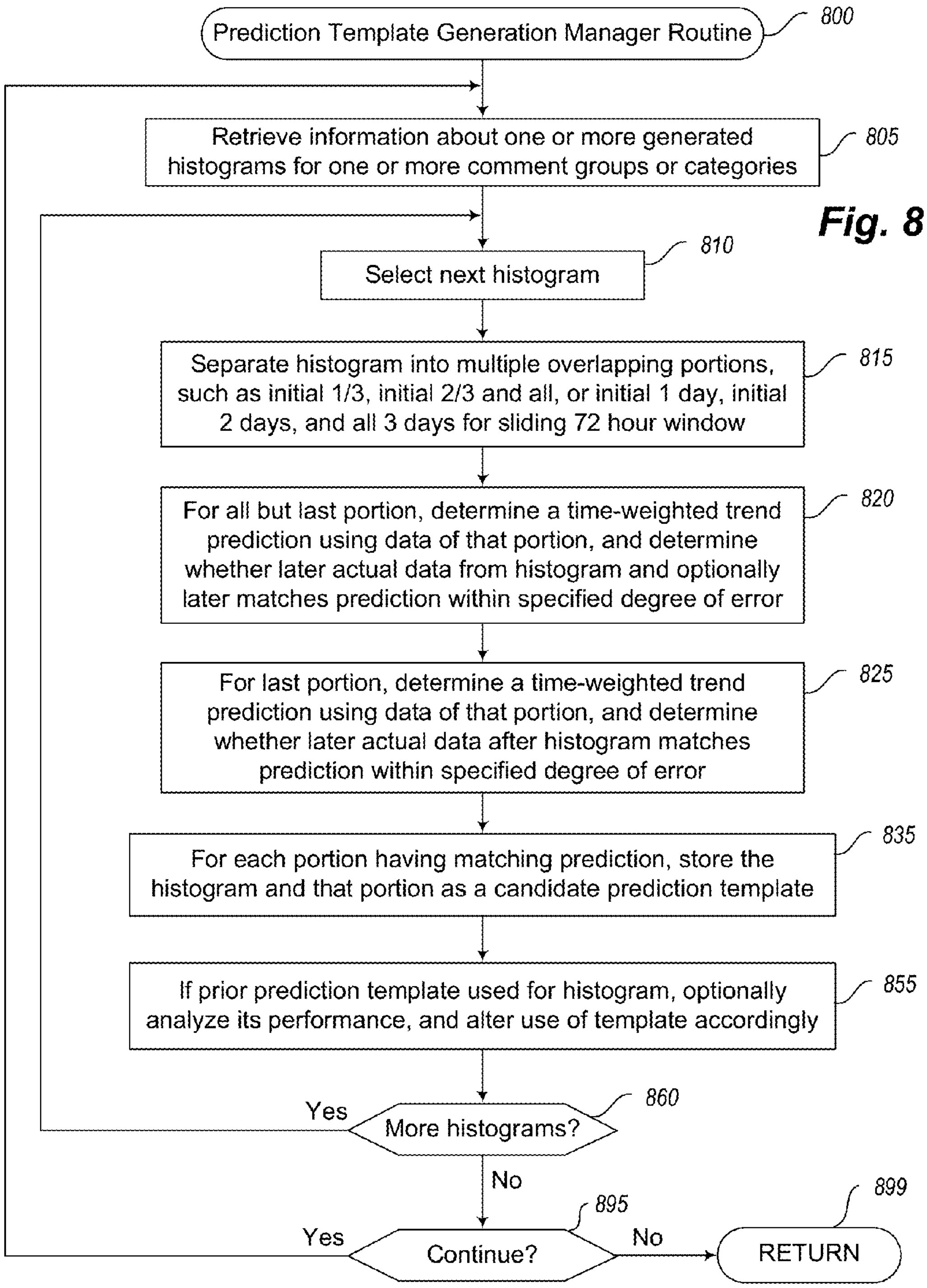
FIG. 8 is an example flow diagram of an illustrated embodiment of a Prediction Template Generation Manager routine.

FIG. 8 is an example flow diagram of an illustrated embodiment of a Prediction Template Generation Manager routine 800. The routine may be performed by, for example, execution of the Prediction Template Generation Manager module 348 of FIG. 3, the group discussion prediction service discussed with respect to FIGS. 2A-2E and/or the Group Discussion Prediction Service 150 of FIG. 1, such as to generate new prediction templates based on prior actual comments associated with a comment group or a category and/or based on predicted future comments for a comment group or a category. The routine may be invoked in various manners in various embodiments and situations, including with respect to block 465 of FIG. 4. In addition, while the illustrated embodiment of the routine discusses analyzing user comments, it will be appreciated that other types of user-supplied content items may be obtained and analyzed in other embodiments, whether instead of or in addition to user comments.

The illustrated embodiment of the routine begins at block 805, where information is retrieved about one or more generated histograms for one or more comment groups or categories, such as for histograms generated in block 725 of routine 700. The routine then continues to block 810 to select the next generated histogram, beginning with the first. In block 815, the routine then separates the generated histogram into multiple overlapping portions, such as the initial ⅓ portion of the generated histogram, the initial ⅔ portion of the generated histogram, and the entire portion of the generated histogram—thus, if the histogram covers, for example, a sliding time window of 72 hours (or 3 days), the multiple overlapping portions may correspond to the first day, the first and second days, and all 3 days. In other embodiments and situations, other types of histogram portions and time lengths may be used.

In blocks 820 and 825, each of the histogram portions is analyzed to determine whether the information in that histogram portion is able to accurately predict additional user comments that will be received, such as if the user comment information represented in that histogram portion represents a typical or otherwise repeated pattern of user comments. In particular, in block 820, for all but the last of the histogram portions, a time-weighted trend prediction is performed using the information in the histogram portion, and additional information about actual user comments received (e.g., from other later portions of the generated histogram) is used to determine whether that trend prediction is consistent with that actual user comment information. In block 825, for the last of the histogram portions, a time-weighted trend prediction is performed using the information in the histogram portion, and additional information about actual user comments received (e.g., from one or more time periods after the sliding time window corresponding to the generated histogram) is used to determine whether that trend prediction is consistent with that actual user comment information—in some situations, such as if the selected histogram was just completed and represents the most current comment information that is available, the performance of the analysis of block 825 may be deferred until additional user comment information is received and analyzed. The time-weighted trend predictions performed in blocks 820 and 825 may, for example, be similar to or the same as that performed in block 750 of routine 700, and the determination of whether the trend prediction is consistent may be performed with respect to a specified degree of error.

After block 825, the routine continues to block 835 to, for each histogram portion having a prediction that is consistent with actual information, store information about the histogram portion (and optionally the subsequent additional information used to verify the prediction) as a candidate histogram template for later use in generating other predictions, such as with respect to block 745 of routine 700.

In some embodiments, the routine may further perform additional optional activities with respect to block 855, to assess whether one or more prior predictions made from use of a prediction template for the histogram were accurate, such as with respect to block 745 of routine 700, and to corresponding alter use of the prediction template. For example, if the prior use of a prediction template was accurate, an accuracy rate for that prediction template may be increased accordingly, and the prediction template may continue to be used, optionally with an increased confidence in its accuracy based on the increased accuracy rate. Conversely, if the prior use of a prediction template was not accurate, an accuracy rate for that prediction template may be decreased accordingly, optionally with a corresponding decreased confidence in its accuracy based on the increased accuracy rate, and the prediction template may be taken out of use if its accuracy rate is too low. The prior use of a prediction template that may be assessed may in some situations include waiting until later actual information is available about user comments that are received, for comparison to the prior prediction made for the histogram. After block 855, the routine continues to block 860 to determine whether more generated histograms are available, and if so returns to block 810 to select a next such histogram.

If it is instead determined in block 860 that no more histograms are available, the routine continues to block 895 to determine whether to continue, such as until an explicit indication to terminate is received. If it is determined to continue, the routine returns to block 805, such as to wait until additional information about generated histograms and/or corresponding actual comment information corresponding to predictions are available. If it is instead determined in block 895 not to continue, the routine instead continues to block 899 and returns, such as to return to block 465 of FIG. 4.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

analyzing, by one or more configured computing systems, contents of a plurality of textual comments to identify topics that are mentioned in the contents, wherein the plurality of textual comments are supplied by human users from multiple geographical locations to multiple information services during a specified prior time period;

using, by the one or more configured computing systems, the contents of the plurality of textual comments to automatically determine a subset of the identified topics that are part of a specified content category for the specified prior time period, the using of the contents including:

generating, by the one or more configured computing systems, a plurality of comment groups based on the identified topics, each of the generated comment groups being associated with one of the identified topics and including one or more of the plurality of textual comments based on the contents of the one or more textual comments mentioning the associated identified topic;

identifying, by the one or more configured computing systems, a subset of the plurality of textual comments that are associated with the specified content category based on the contents of the textual comments of the identified subset, the textual comments of the identified subset being included in multiple of the generated comment groups;

determining, by the one or more configured computing systems, a subset of the multiple generated comment groups that correspond to the specified content category for the specified prior time period, the determining including excluding at least one first comment group whose included textual comments appear in the identified subset less than a determined minimum threshold, the determining further including excluding at least one second comment group whose included textual comments appear in the identified subset more than a determined maximum threshold; and selecting, by the one or more configured computing systems and for each generated comment group in the subset of generated comment groups, the associated topic for the generated comment group to include in the subset of the identified topics that are part of the specified content category for the specified prior time period, wherein the subset of the identified topics includes multiple topics;

providing, by the one or more configured computing systems, indications of the multiple topics as representing the specified content category for the specified prior time period;

tracking, by the one or more configured computing systems and for at least one comment group in the subset, changes between the specified prior time period and one or more other time periods in at least one of textual comments supplied from the multiple geographical locations for the topic associated with the at least one comment group, or textual comments supplied to the multiple information sources for the topic associated with the at least one comment group; and providing, by the one or more configured computing systems, information about the tracked changes between the specified prior time period and the one or more other time periods for the topic associated with the at least one comment group.

2. The method of claim 1 further comprising:

determining, by the one or more configured computing systems, and for one of the comment groups of the determined subset, a quantity of the textual comments included in the one comment group;

determining, by the one or more configured computing systems and based at least in part on the determined quantity, one or more types of information to make available corresponding to at least one of the specified content category and the identified topic associated with the one comment group; and supplying, by the one or more configured computing systems, one or more additional textual comments that are available to the human users and that have contents corresponding to the determined one or more types of information.

3. The method of claim 2 wherein the plurality of textual comments are part of user posts to one or more social networking services by the human users, and wherein the supplying of the one or more additional textual comments includes supplying the additional textual comments to at least one of the social networking services as additional posts.

4. The method of claim 1 further comprising:

determining, by the one or more configured computing systems, and for each of the comment groups of the determined subset, a quantity of the textual comments included in the comment group;

predicting, by the one or more configured computing systems, and for each of the comment groups of the determined subset, an expected quantity of future textual comments associated with the identified topic for the comment group that will be supplied by human users during a future time period, the predicting being based in part on the determined quantity for the comment group; and providing, by the one or more configured computing systems, an indication of the predicted expected quantity of future textual comments for one or more of the comment groups of the determined subset.

5. The method of claim 1 further comprising:

determining, by the one or more configured computing systems, and for each of the comment groups of the determined subset, a quantity of the textual comments included in the comment group;

predicting, by the one or more configured computing systems, an expected quantity of future textual comments associated with the specified content category that will be supplied by human users during a future time period, the predicting being based in part on a combination of the determined quantities for the comment groups of the determined subset; and providing, by the one or more configured computing systems, an indication of the predicted expected quantity of future textual comments for the specified content category.

6. The method of claim 1 wherein the tracking of the changes between the specified prior time period and the one or more other time periods for the at least one comment groups includes tracking changes between the specified prior time period and the one or more other time periods in the textual comments supplied from the multiple geographical locations for the topic associated with the at least one comment group, and further includes:

determining, by the one or more configured computing systems, and for each of the at least one comment groups, distinct subsets of the textual comments included in the comment group that are associated with each of the multiple geographical locations for the specified prior time period;

determining, by the one or more configured computing systems, and for each of the multiple geographical locations, a quantity of the textual comments included in the subset associated with the geographical location for the specified prior time period; and providing, by the one or more configured computing systems, information about the determined quantity for each of one or more of the multiple geographical locations for the specified prior time period.

7. The method of claim 1 wherein the plurality of textual comments are posts supplied to social networking services, and wherein the tracking of the changes between the specified prior time period and the one or more other time periods for the at least one comment groups further includes tracking changes between the specified prior time period and the one or more other time periods in textual comments supplied by multiple users of the plurality of users, by:

determining, by the one or more configured computing systems, and for each of the at least one comment groups, distinct subsets of the textual comments included in the comment group that are associated with each of the multiple human users for the specified prior time period;

determining, by the one or more configured computing systems, and for each of the multiple human users, a quantity of the textual comments included in the subset associated with the human user for the specified prior time period; and providing, by the one or more configured computing systems, information about the determined quantity for each of one or more of the multiple human users for the specified prior time period.

8. The method of claim 1 wherein the tracking of the changes between the specified prior time period and the one or more other time periods for the at least one comment groups includes tracking changes between the specified prior time period and the one or more other time periods in the textual comments supplied to the multiple information sources for the topic associated with the at least one comment group, and further includes:

determining, by the one or more configured computing systems, and for each of the at least one comment groups, distinct subsets of the textual comments included in the one comment group that are associated with each of the multiple information sources for the specified prior time period;

determining, by the one or more configured computing systems, and for each of the multiple information sources, a quantity of the textual comments included in the subset associated with the information source for the specified prior time period; and providing, by the one or more configured computing systems, information about the determined quantity for each of one or more of the multiple information sources for the specified prior time period.

9. The method of claim 1 wherein the one or more configured computing systems are part of a group discussion prediction service, wherein the specified content category is indicated by a client of the group discussion prediction service, and wherein the providing of the indications of the multiple topics includes providing information to the client in accordance with criteria specified by the client.

10. The method of claim 1 further comprising:

performing an influence analysis of the textual comments included in one or more comment groups of the determined subset to identify a first author user of the human users who has greater influence in affecting comments of other users than one or more other second author users of the human users; and providing one or more indications of the first author user and the performed influence analysis.

11. The method of claim 1 further comprising:

determining, with respect to the textual comments included in one or more comment groups of the determined subset, an increase or a decrease in a positive or negative sentiment relative to multiple textual comments supplied during the one or more other time periods; and providing one or more indications of the determined increase or decrease in the positive or negative sentiment.

12. The method of claim 1 wherein the identified plurality of topics are each a term or phrase.

13. The method of claim 1 wherein the identified plurality of topics are each a hashtag.

14. The method of claim 1 further comprising:

determining, for each of the one or more other time periods, a plurality of comment groups that correspond to the specified content category for the additional prior time period and that have corresponding topics, wherein the corresponding topics for the determined plurality of comment groups of the other time periods are distinct from the multiple topics determined to correspond to the specified content category for the specified prior time; and providing indications of one or more topic changes for the specified content category between the specified prior time period and the one or more other time periods.

15. A non-transitory computer-readable medium having stored contents that cause one or more computing systems to perform a method, the method comprising:

analyzing, by the one or more computing systems, a plurality of user-supplied content items to identify a plurality of attributes that are each associated with one or more of the plurality of user-supplied content items;

generating, by the one or more computing systems, a plurality of comment groups based on the identified attributes, each of the generated comment groups being associated with one of the identified attributes and including one or more of the plurality of user-supplied content items that have the associated identified attribute;

identifying, by the one or more computing systems, a subset of the plurality of user-supplied content items that are associated with a specified content category based on contents of the user-supplied content items of the identified subset, the user-supplied content items of the identified subset being included in multiple of the generated comment groups;

determining, by the one or more computing systems, a subset of the multiple generated comment groups that correspond to the specified content category, the determining including excluding one or more comment groups each having included user-supplied content items that appear in the identified subset less than a determined minimum threshold or more than a determined maximum threshold; and providing, by the one or more computing systems, information identifying one or more determined topics for the specified content category based on the associated identified attributes for one or more of the generated comment groups in the determined subset.

16. The non-transitory computer-readable medium of claim 15 wherein the plurality of content items are supplied by multiple human users to multiple data sources, wherein some content items of the plurality of content items each has one or more associated tags that are supplied by one or more users to describe that content item, wherein other content items of the plurality of content items each has one or more associated tags that are supplied by at least one of the data sources to describe that content item, and wherein the stored contents further cause the one or more computing systems to quantify, based at least in part on tags associated with the content items of the plurality, information of one or more types about at least one comment group of the generated comment groups.

17. The non-transitory computer-readable medium of claim 16 wherein the stored contents further cause the one or more computing systems to, before the analyzing of the plurality of user-supplied content items, obtain content items from the at least one comment data source that meet one or more specified criteria.

18. The non-transitory computer-readable medium of claim 16 wherein the stored contents further cause the one or more computing systems to generate an aggregation of information that includes user-supplied content items in the generated comment groups of the determined subset and is based at least in part on the quantified information, including using weighting to reflect one or more factors for the quantified information of the generated aggregation.

19. The non-transitory computer-readable medium of claim 16 wherein the stored contents further cause the one or more computing systems to select one of the generated comment groups for further analysis based at least in part on one or more of the data sources associated with the selected one generated comment group.

20. The non-transitory computer-readable medium of claim 16 wherein the stored contents further cause the one or more computing systems to analyze the generated comment groups based on one or more metrics, and wherein the determining of the subset is further based at least in part on the analyzing of the generated comment groups and includes using a specified minimum certainty threshold.

21. The non-transitory computer-readable medium of claim 15 wherein the plurality of content items are comments supplied by a plurality of human users to one or more social networking services, wherein the identified plurality of attributes include a plurality of terms included in contents of the plurality of content items, and wherein the one or more computing systems are part of a group discussion prediction system.

22. The non-transitory computer-readable medium of claim 15 wherein the stored contents include software instructions that, when executed, further cause the one or more computing systems to perform, for each of a plurality of distinct time periods, the analyzing and the generating and the identifying and the determining and the providing based on content items supplied by users during the time period, and wherein the providing of the indications of the one or more determined multiple topics includes identifying a change in one or topics that are associated with the specified content category between multiple time periods.

23. The non-transitory computer-readable medium of claim 15 wherein the plurality of attributes include at least one of multiple geographical locations from which content items are supplied and multiple information sources to which content items are supplied, wherein the plurality of content items are supplied by users during a time period, and wherein the stored contents include software instructions that, when executed, further cause the one or more computing systems to:

track, by the one or more computing systems and for at least one comment group in the subset of generated comment groups, changes between the time period and the one or more other time periods in at least one of content items supplied from the multiple geographical locations for the at least one comment group, or content items supplied to the multiple information sources for the at least one comment group; and provide further information about the tracked changes between the time period and the one or more other time periods for the at least one comment group.

24. The non-transitory computer-readable medium of claim 15 wherein the plurality of attributes include users who supplied content items, and words included in contents of content items.

25. A system, comprising:

one or more hardware processors of one or more computing systems; and one or more modules that, when executed by at least one of the one or more hardware processors, cause the at least one hardware processors to determine multiple topics associated with a specified content category based on information supplied by users, the determining of the multiple topics including:

analyzing a plurality of user-supplied content items to identify a plurality of attributes that are each associated with one or more of the plurality of user-supplied content items, including identifying topics associated with the plurality of user-supplied content items, and wherein the plurality of user-supplied content items are supplied by a plurality of users during a time period;

using the identified attributes of the plurality of user-supplied content items to automatically determine a subset of the identified topics that are part of the specified content category for the time period, the using of the identified attributes including:

generating a plurality of comment groups based on the identified attributes, each of the generated comment groups being associated with one of the identified attributes and including one or more of the plurality of user-supplied content items that have the associated identified attribute;

identifying a subset of the plurality of user-supplied content items that are associated with the specified content category based on the identified attributes of the user-supplied content items of the identified subset, the user-supplied content items of the identified subset being included in multiple of the generated comment groups;

determining a subset of the multiple generated comment groups that correspond to the specified content category, the determining including excluding one or more comment groups each having included user-supplied content items that appear in the identified subset less than a determined minimum threshold or more than a determined maximum threshold; and selecting, for each generated comment group in the subset of generated comment groups, an associated topic for the generated comment group to include in the determined subset of the identified topics that are part of the specified content category for the time period;

providing indications of the identified topics of the determined subset as being associated with the specified content category for the time period;

tracking changes, between the time period and one or more other time periods in topics, in topics determined as being associated with the specified content category; and providing information about the tracked changes between the time period and the one or more other time periods in the topics determined as being associated with the specified content category.

26. The system of claim 25 wherein the plurality of content items are comments supplied to one or more social networking services, wherein the identified plurality of attributes include a plurality of terms included in contents of the plurality of content items, and wherein the one or more modules includes software instructions of a group discussion prediction system that are stored in one or more memories of the system for execution by the at least one hardware processors.

27. The system of claim 25 wherein the determining of the multiple topics associated with the specified content category includes performing the analyzing of user-supplied content items and the using of the identified attributes for each of a plurality of distinct time periods based on content items supplied by users during the time period, the plurality of time periods including the one or more other time periods.

28. The system of claim 25 wherein the plurality of attributes include at least one of multiple geographical locations from which contents item are supplied and multiple information sources to which content items are supplied, and wherein the one or more modules include software instructions that, when executed, further cause the at least one hardware processor to:

track, for at least one comment group in the subset of generated comment groups, changes between the time period and the one or more other time periods in at least one of content items supplied from the multiple geographical locations for the at least one comment group, or content items supplied to the multiple information sources for the at least one comment group; and provide further information about the tracked changes between the time period and the one or more other time periods for the at least one comment group.

29. The system of claim 25 wherein the one or more modules consists of one or more means for performing the determining of the multiple topics associated with the specified content category based on the information supplied by the users.

30. The system of claim 25 wherein the plurality of attributes include users who supplied content items, and words included in contents of content items.

* * * * *

UNITED STATES PATENT AND TRADEMARK OFFICE

CERTIFICATE OF CORRECTION

PATENT NO. : 9,674,128 B1
APPLICATION NO. : 15/173402
DATED : June 6, 2017
INVENTOR(S) : Randolph Browning et al.

It is certified that error appears in the above-identified patent and that said Letters Patent is hereby corrected as shown below:

In the Claims

Column 32, Line 58:
"included in the one comment group that are associated" should read, --included in the comment group that are associated--.

Column 35, Line 5:
"change in one or topics that are associated with the specified" should read, --change in one or more topics that are associated with the specified--.

Column 36, Line 29:
"modules includes software instructions of a group discussion" should read, --modules include software instructions of a group discussion--.

Signed and Sealed this
Third Day of April, 2018

Andrei Iancu
*Director of the United States Patent and Trademark Office*